Jan. 27, 1970  G. W. PONCY  3,492,190
AUTOMATIC BAG MACHINE
Filed Dec. 16, 1964  16 Sheets-Sheet 2

INVENTOR
George W. Poncy

BY
ATTORNEY

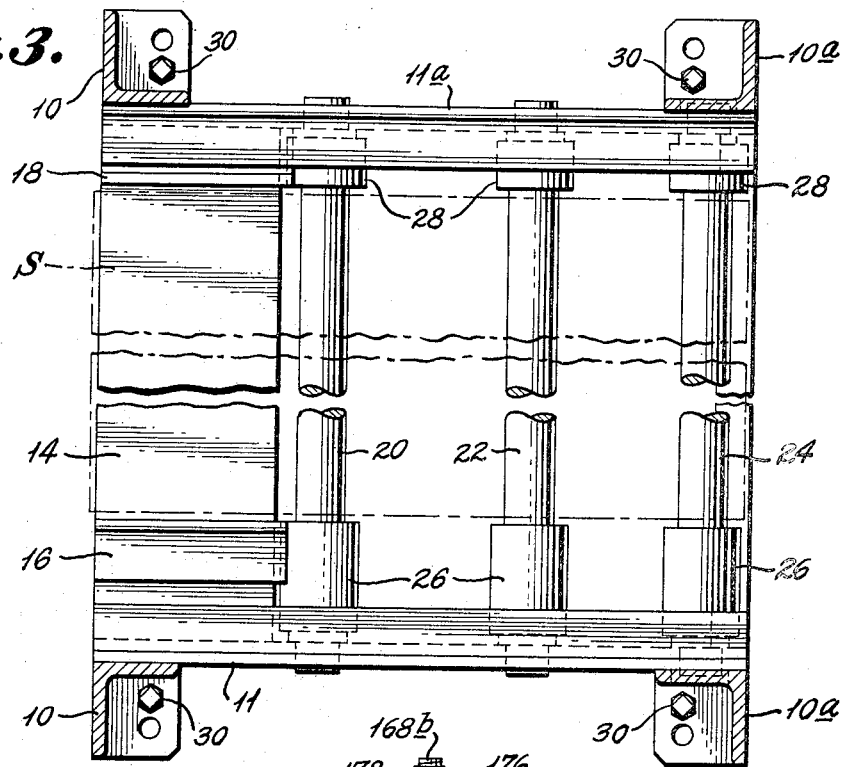
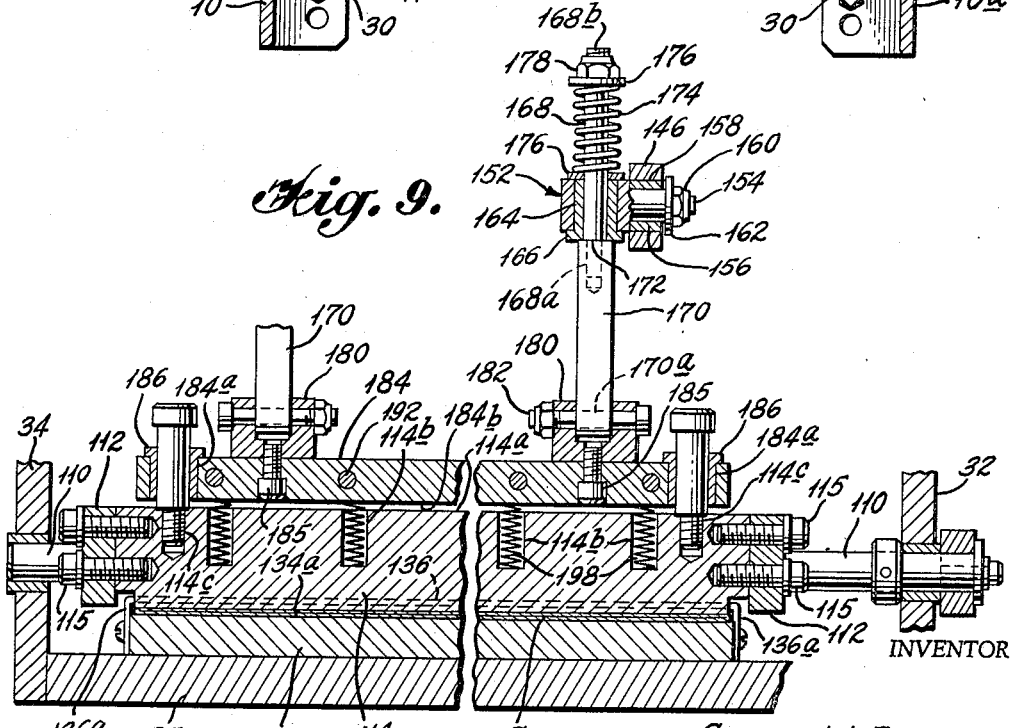

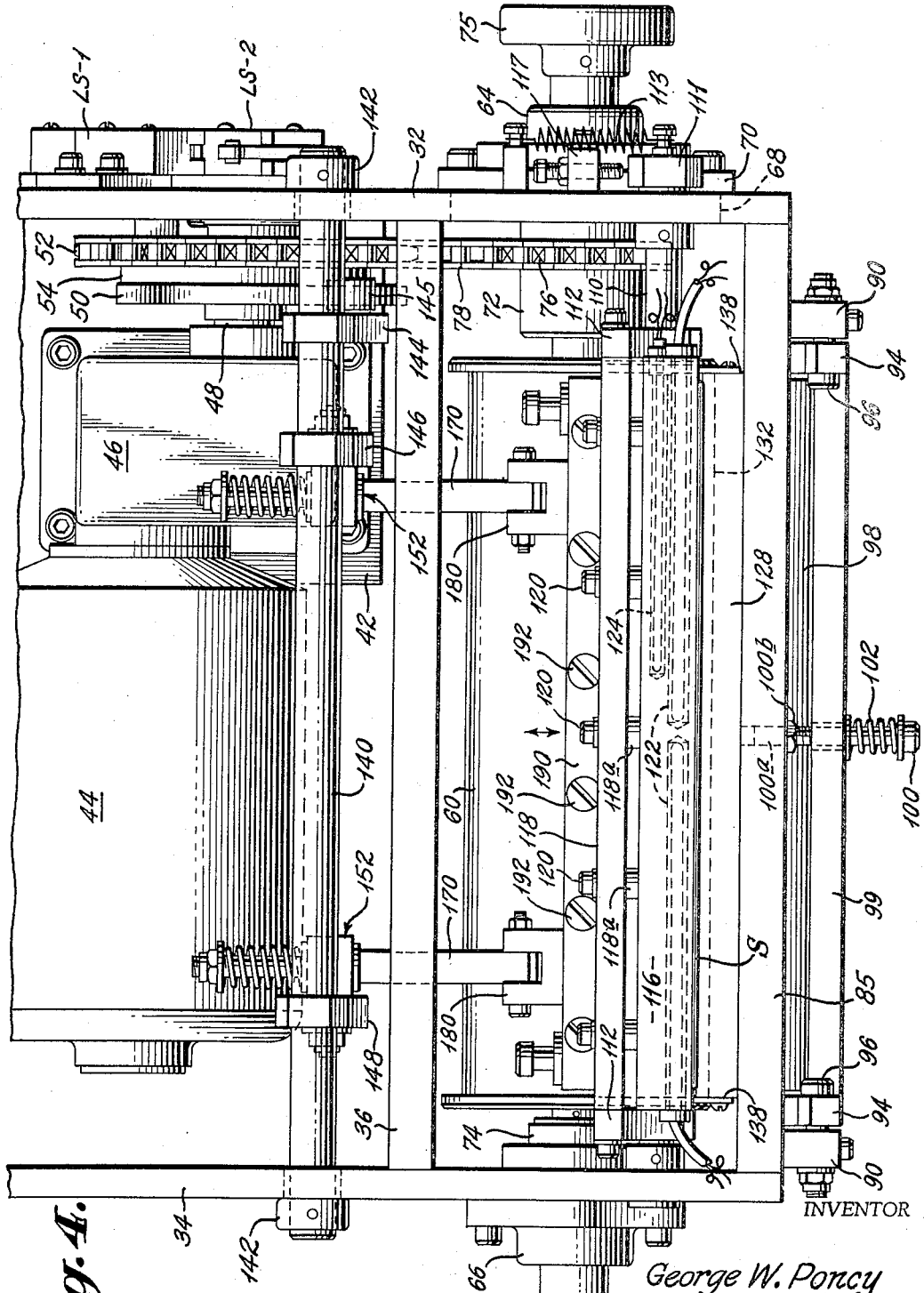

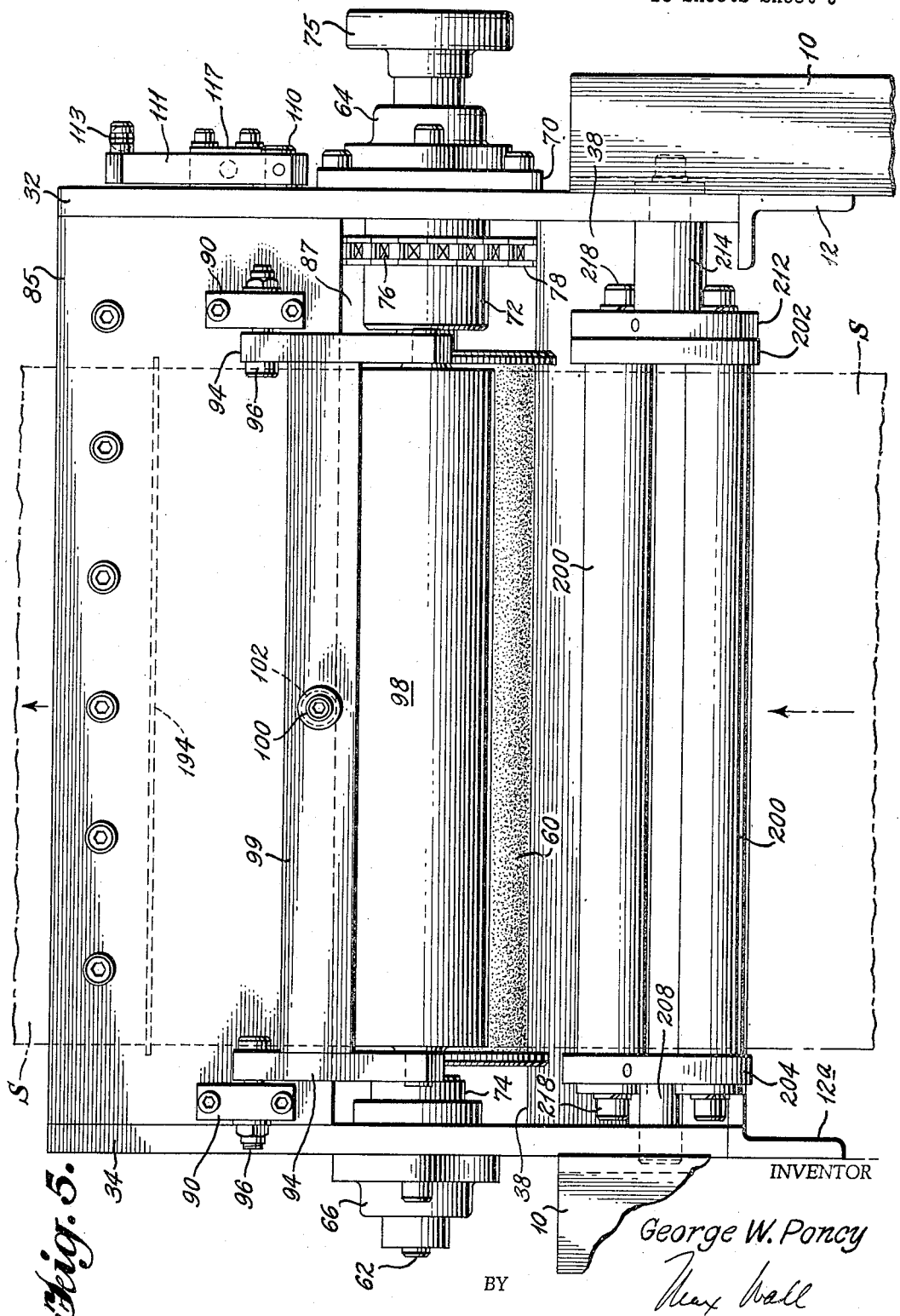

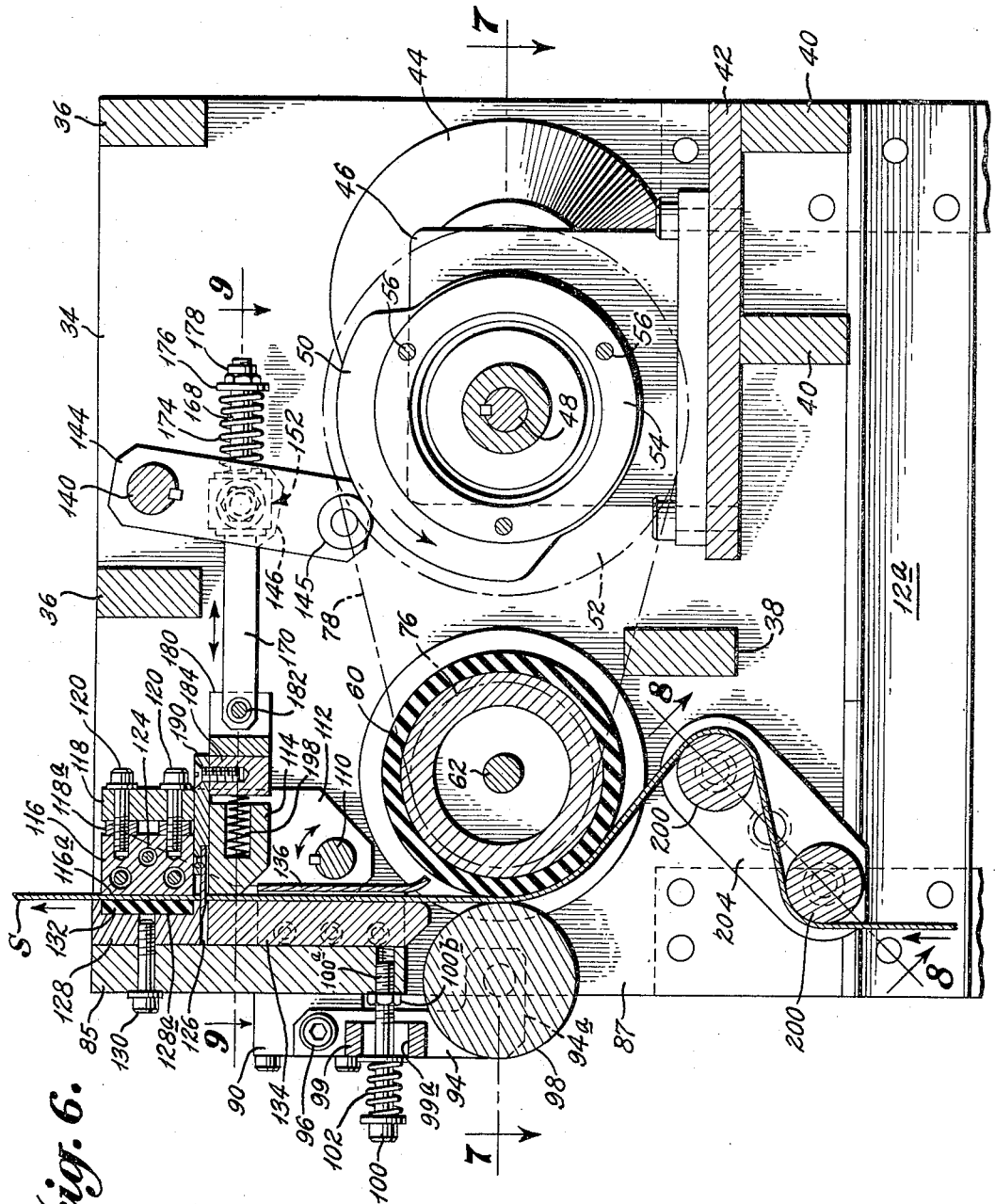

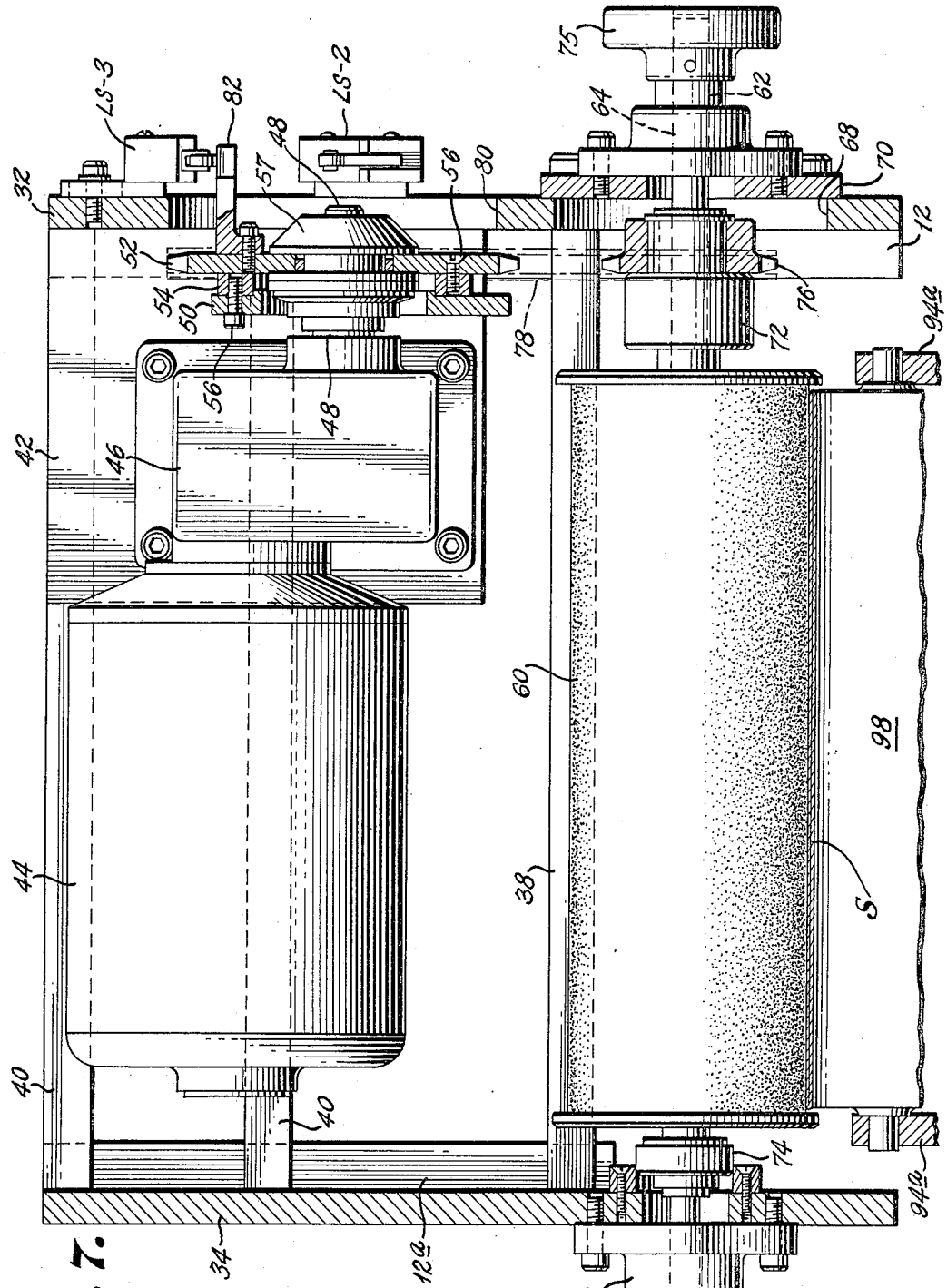

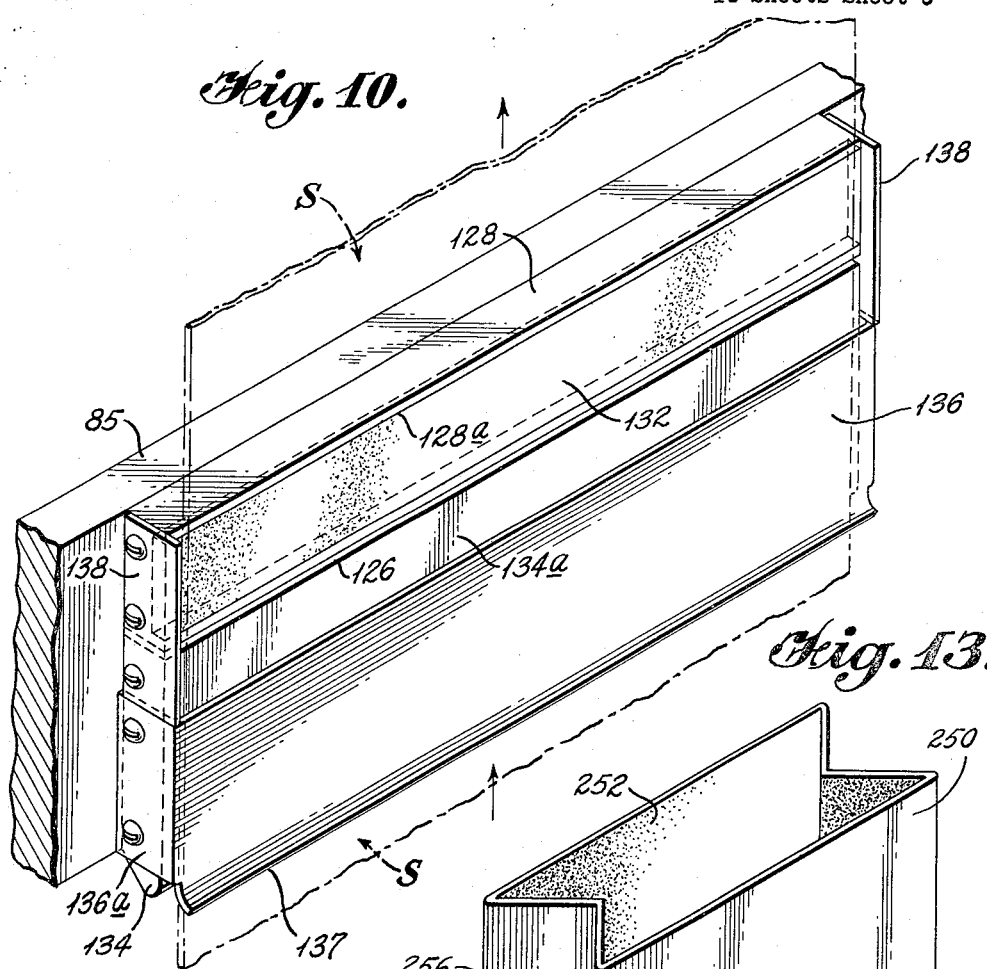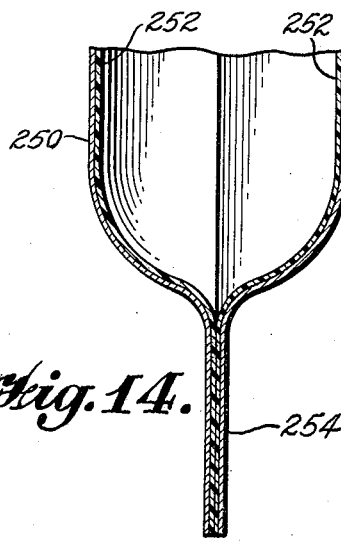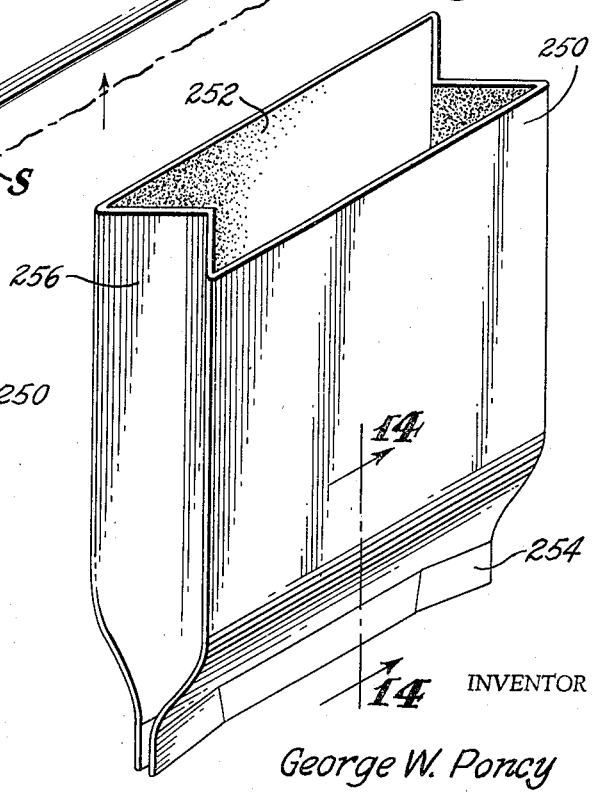

Jan. 27, 1970 G. W. PONCY 3,492,190
AUTOMATIC BAG MACHINE
Filed Dec. 16, 1964 16 Sheets-Sheet 9
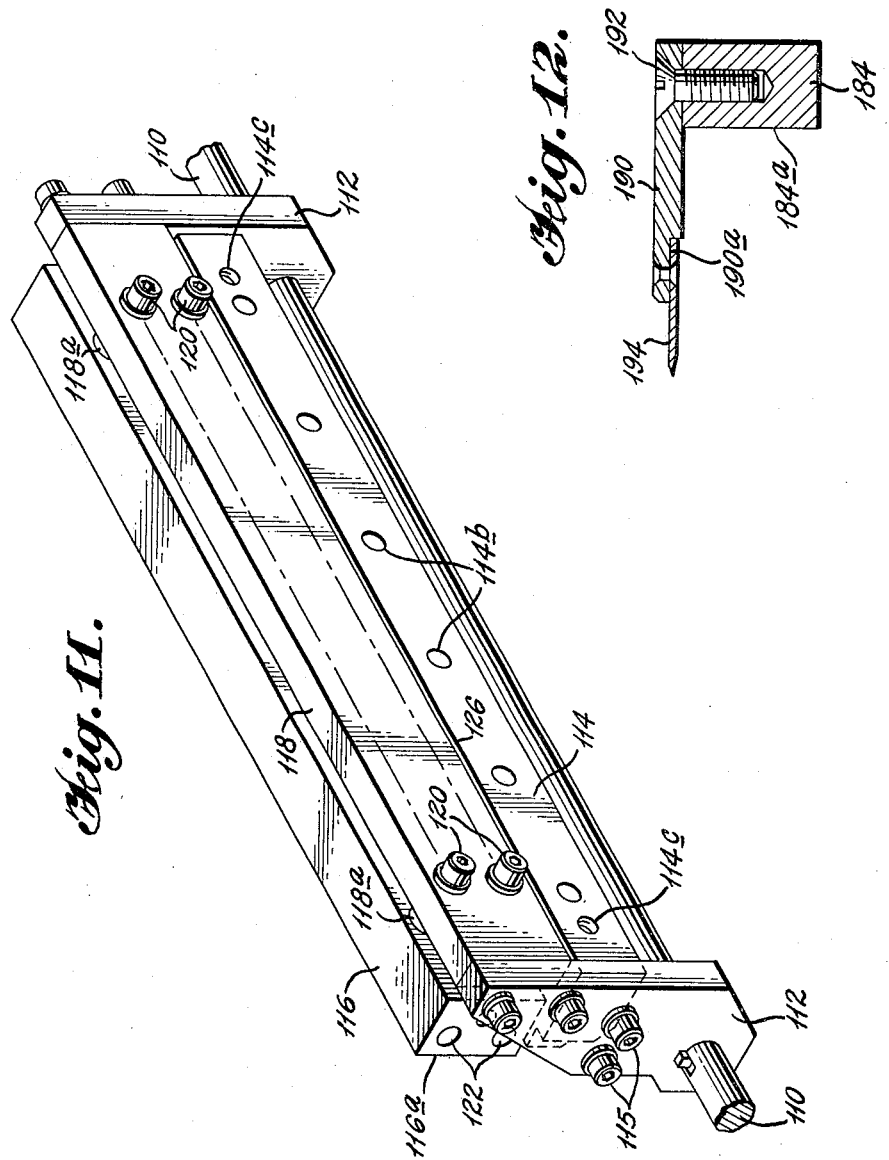
INVENTOR
George W. Poncy
BY
ATTORNEY INVENTOR
George W. Poncy
BY
ATTORNEY

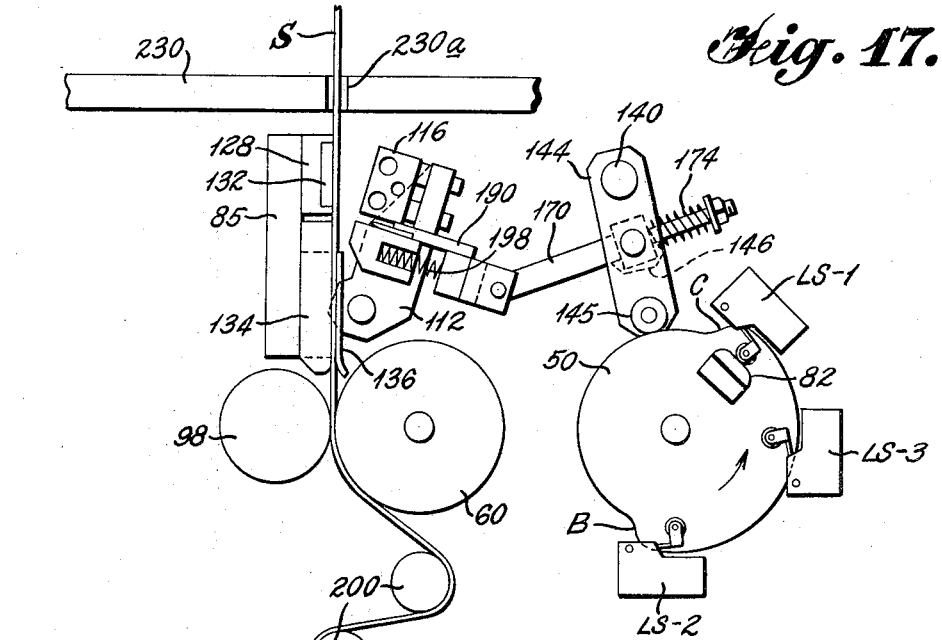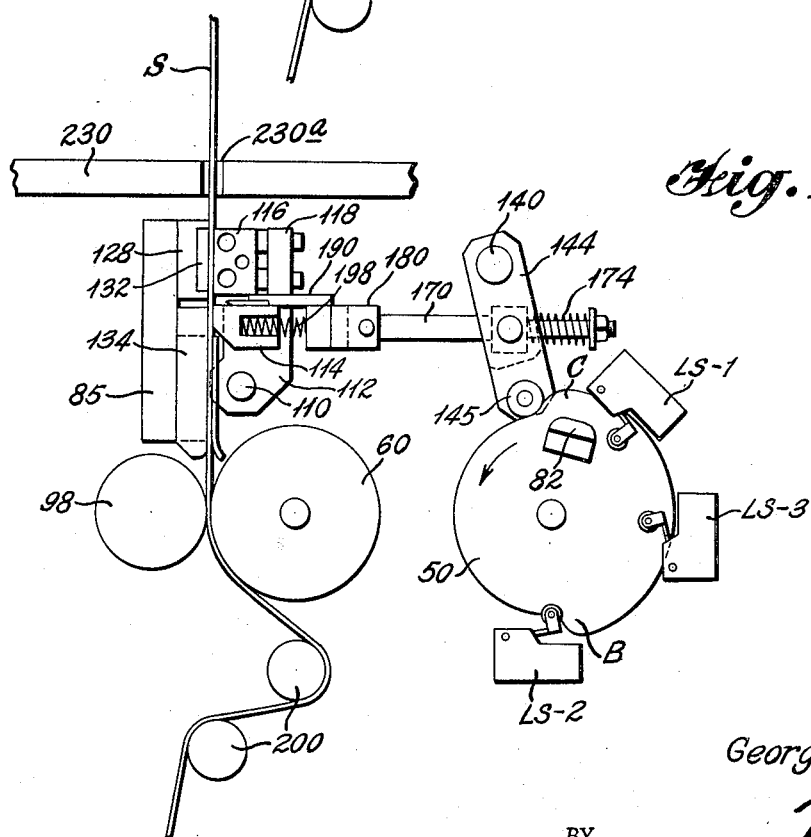

Jan. 27, 1970  G. W. PONCY  3,492,190
AUTOMATIC BAG MACHINE
Filed Dec. 16, 1964  16 Sheets-Sheet 12

INVENTOR
George W. Poncy

BY

ATTORNEY

Jan. 27, 1970      G. W. PONCY      3,492,190
AUTOMATIC BAG MACHINE
Filed Dec. 16, 1964      16 Sheets-Sheet 15

INVENTOR
George W. Poncy

BY

ATTORNEY

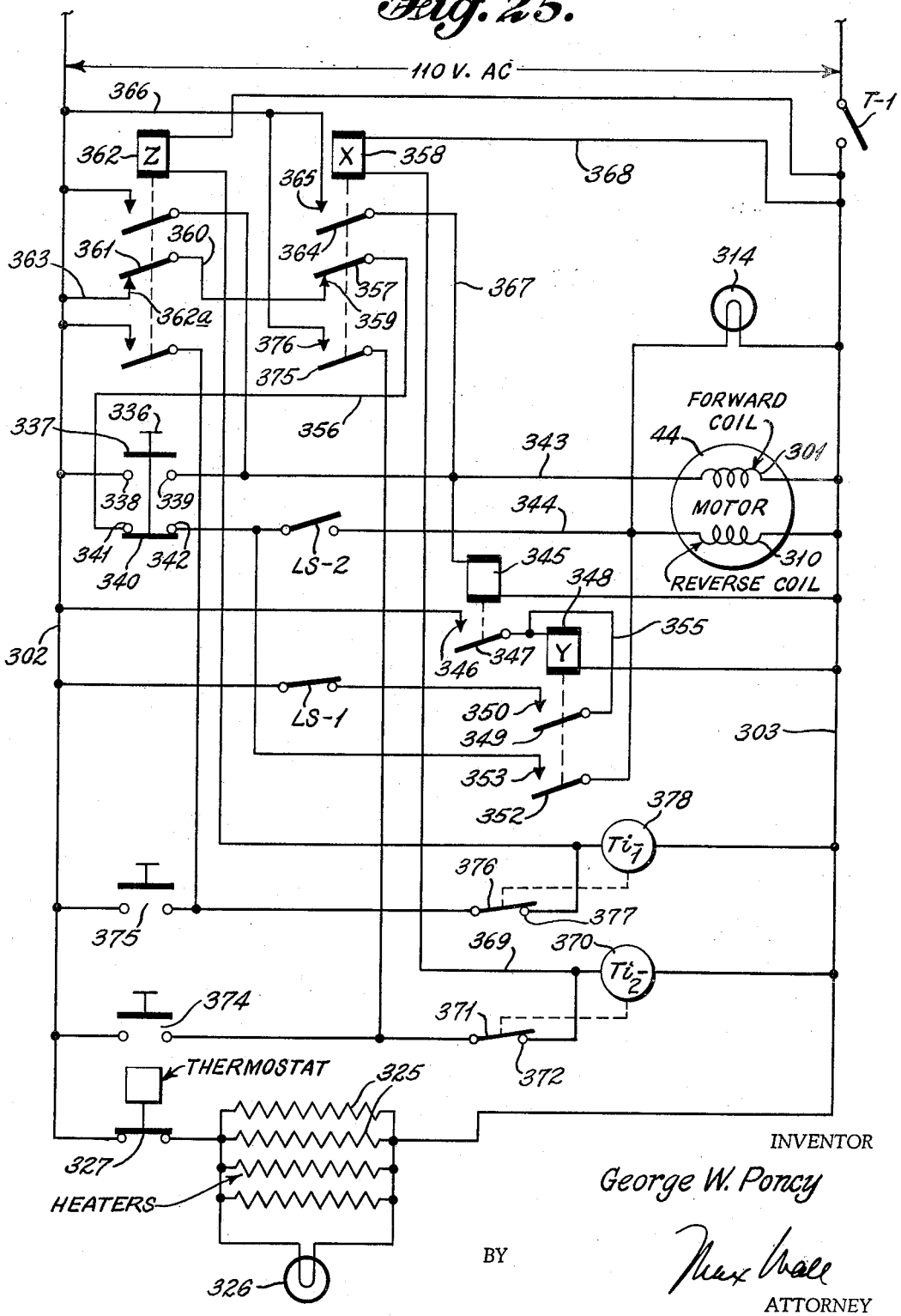

United States Patent Office 3,492,190
Patented Jan. 27, 1970

3,492,190
AUTOMATIC BAG MACHINE
George W. Poncy, Chatham, N.J., assignor to Automatic Bag Corporation, Chatham, N.J., a corporation of New Jersey
Filed Dec. 16, 1964, Ser. No. 418,616
Int. Cl. B32b *31/18, 31/26;* B30b *15/24*
U.S. Cl. 156—530                                          19 Claims

ABSTRACT OF THE DISCLOSURE

A machine for making consecutive bags of any desired length from one bag to another at the will of the operator. Bags may be made all of the same length or each bag may be of a different length and bags of the same length may be made and interspersed with bags of different lengths, and vice versa.

---

This invention relates to bag making machines and more particularly relates to a novel and improved machine for automatically making plastic coated paper bags, and bags of wholly plastic materials, or various combinations of paper and plastic materials, of a length which may vary at the will of the operator, or which may be predetermined and preset, from tubular stock, which may be gusseted or not, stored in the machine. The invention provides for feeding the stock to a sealing and cutting off device either in a series of predetermined lengths or in lengths variable at will, and heat sealing one end of the bag and cutting off the completed bag in an appropriate desired length. The invention can be used to make bags of any known heat sealable material, or non heat-sealable material but containing a heat sealable coating on the inner surface.

In present day supermarkets, the customer's total purchases are usually packaged by the store clerk in large paper bags, and where the purchases amount to a substantial number of items, the clerk will frequently insert one bag within another for the purpose of strengthening the bags. Where the purchases amount to only a few items, being limited in the supply of bag sizes, the clerk will usually package said items in a large bag because that is usually what he has more readily available. Both of these practices result in bag waste, with consequent increase in cost to the store owner.

One of the principal objects of the present invention, therefore, is to provide a simple and inexpensive machine which can be stored under the store counter or elsewhere in a convenient manner, or which can become an integral part of said counter, and which can be operated in a simple manner to produce a bag of the desired length for packing accumulated purchases, the bag being delivered to the clerk through an appropriate slot in the counter top at the will of the clerk. The machine may be made portable so that it can be moved, for example, from one vegetable bin to another, as the clerk makes sealed packages of fresh vegetables, or other items.

In the practice of this invention, it is contemplated that the bag stock will be made of any suitable paper, such as Kraft, or other continuous flexible material such as fabrics or foils, thinly coated on the inner surface with a waterproof, heat sealable, plastic material such as polyethylene or an appropriate substitute. The coated stock will then be folded to form a tube with or without side gussets, with the coated surface on the inside of the tube. The stock will then be wound into rolls on a suitable core for insertion into the machine, where it is manually threaded through the operating parts prior to initiation of the automatic operation.

A further object of the invention, therefore, is to provide a machine which is fully automatic in nature, which is capable of continuous or intermittent operation, the machine feeding the stock past the clamping and sealing means, interrupting the feeding while the clamping, sealing and cutoff operation takes place, and then resuming the feeding while the clamping, sealing and cutoff mechanism is released in the performance of another cycle of operation. This sealing and cutoff operation is of short duration, in the nature of a few seconds. A pilot light indicates completion of the sealing and cutoff operation, at which time the bag may be removed for filling elsewhere, if so desired. Filling the bag at the point of emission through the counter slot can be started as soon as the upward motion of the bag has come to a stop. Another object of the invention is, in a bag making machine, to control, at the will of the operator, the length of time the bag material is fed to the sealing and cutting off means. By this means the length of the bag made may be varied consecutively at the will of the operator from one bag to another, limited only by the length of the supply material.

Still a further object is to provide a unique machine in which the driving means for the feeding mechanism can be interrupted to stop the feeding mechanism, the drive means thereupon being reversed and connected to the clamping, sealing and cutoff mechanism. Upon completion of the cutting-off operation, the clamping and sealing mechanism is automatically released thereby completing a cycle of operation, and the driving means is again automatically reversed to engage and drive the feeding mechanism where another cycle is initiated.

Other objects will become apparent from the following description and annexed drawings, which are illustrative only to depict practical embodiments of the invention.

In the drawings:

FIGURE 3 is a horizontal sectional view taken along line 3—3 of FIGURE 1.

FIGURE 4 is a top plan view of the machine.

FIGURE 5 is a front elevation of the upper portion of the machine as seen in FIGURE 1.

FIGURE 6 is a vertical sectional view through the upper portion of the machine.

FIGURE 7 is a horizontal sectional view taken along line 7—7 of FIGURE 6.

FIGURE 9 is a fragmentary horizontal sectional view of the stock clamping mechanism, taken along the line 9—9 of FIGURE 6.

FIGURE 10 is an isometric view of the fixed portion of the clamping and sealing mechanism and the web stock guide.

FIGURE 11 is an isometric view of the pivoted portion of the clamping and sealing mechanism.

FIGURE 12 is a vertical transverse section through the knife blade and its supporting structures.

FIGURE 13 is a perspective view of a bag produced by the machine of this invention.

FIGURE 14 is a fragmentary vertical sectional view along line 14—14 of FIGURE 13.

FIGURES 15 through 19 are diagrams showing the operation of the machine.

FIGURE 25 is a wiring diagram of the electrical circuit of the machine for producing bags of several predetermined lengths as well as bags of any desired length, at the will of the operator.

Figure 1:
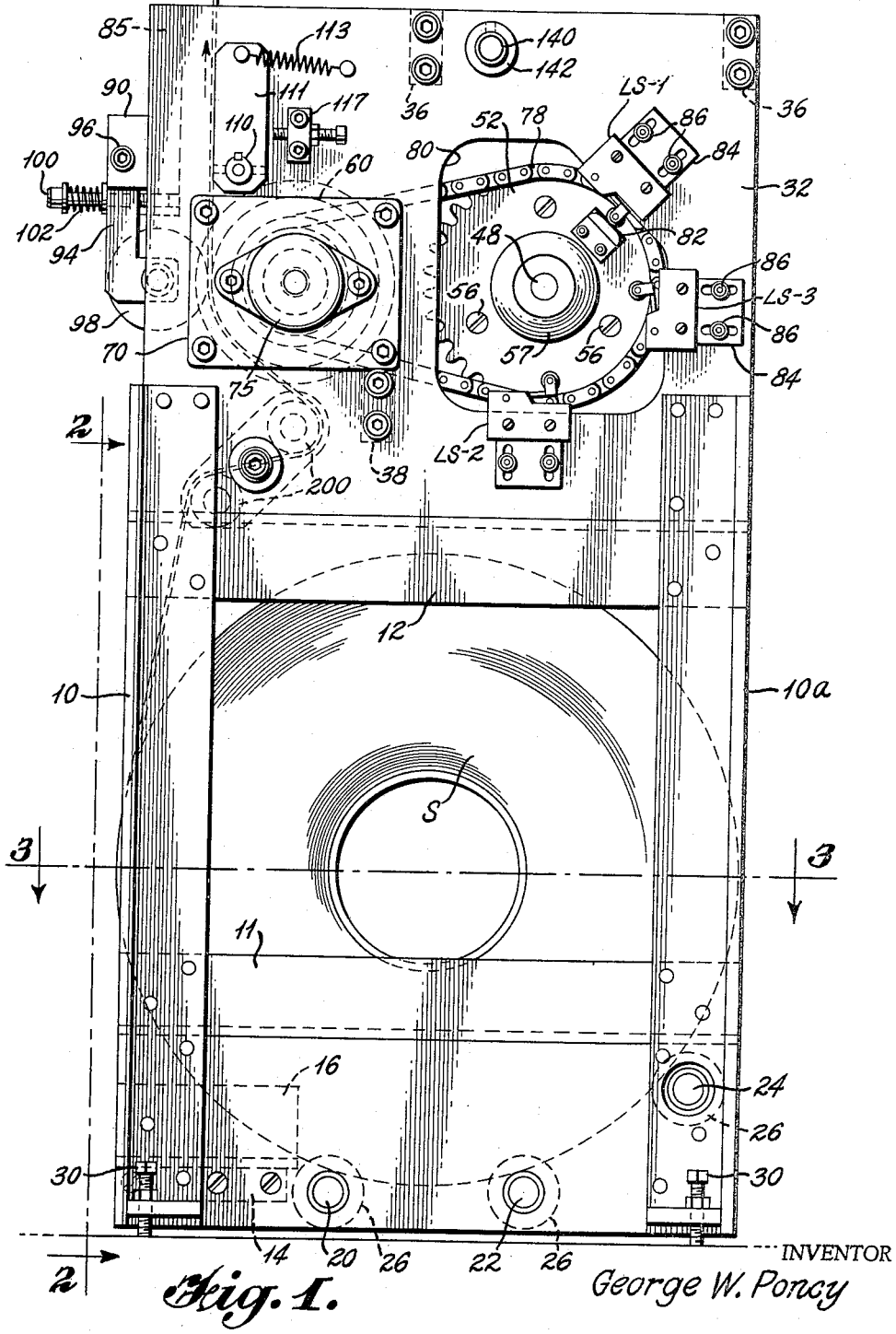
FIGURE 1 is a side elevation of the machine of this invention.
Figure 2:
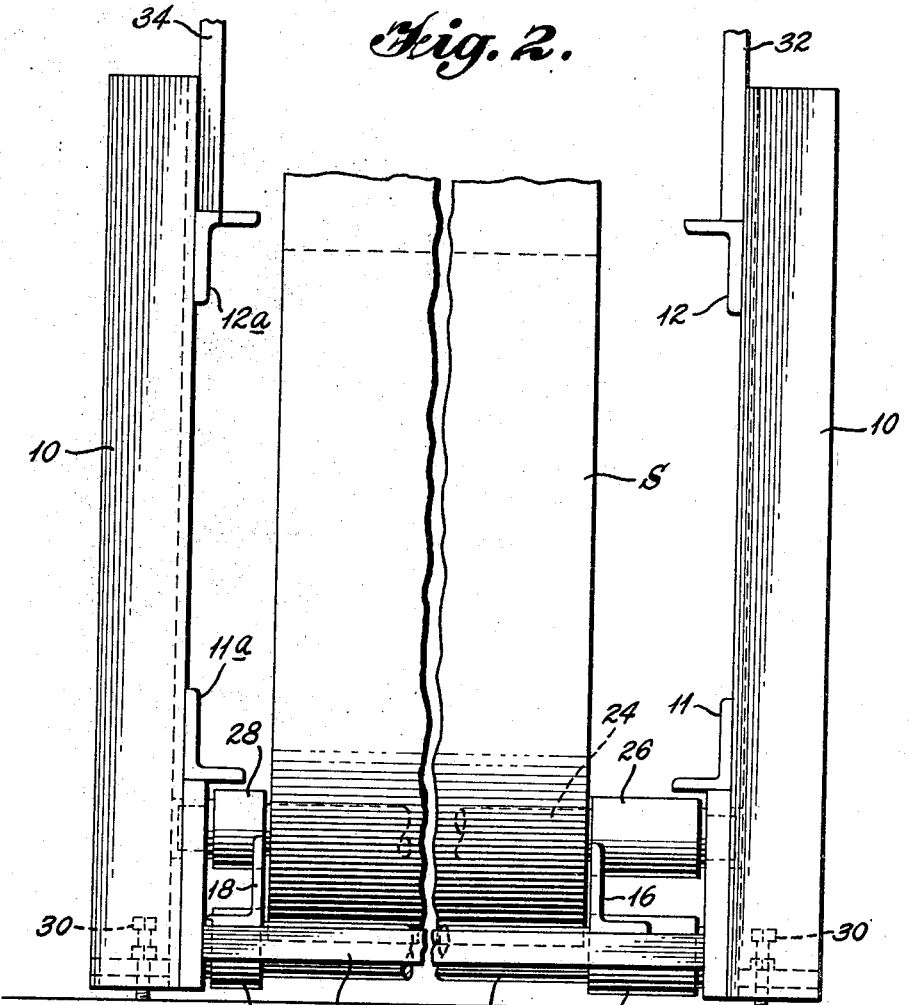
FIGURE 2 is a front elevation of the lower portion of the machine, taken along line 2—2 of FIGURE 1.

The invention comprises a frame having vertical members 10, 10a FIGURES 1, 2, 3, tied together by cross frame members such as 11, 11a, 12 12a, on opposite sides of the machine. A spacer plate 14 is supported in the frame of the machine at the bottom thereof along the front end, FIGURES 1, 2, and this plate supports two spaced angle iron members 16 and 18, which are suitably secured to the plate 14. These angle iron members serve as guides for the roll of stock which is introduced from the front end of the machine. Three stock supporting roller members 20, 22, 24 are suitably spaced apart and rotatably supported in the frame at the lower end of the machine and form a cradle receiving a roll of heat sealable, tubular stock material S, and spacer members 26, 28, FIGURES 1, 2, 3, are mounted on the rollers, respectively, one at each end, to properly position and orient the roll of stock on the rollers with respect to the feeding apparatus above it, which is about to be described. Levelling screws 30 are provided on the bottom of the vertical members 10, 10a to level the machine when placed in its operating site. The working mechanism of the machine is supported above the roll of stock in a frame which rests on the angle members 12, 12a.

The frame for the working mechanism comprises side plates 32, 34, FIGURES 1, 2 and 6, tied together by upper and lower crossbars 36, 38, respectively, the bars being suitably permanently fastened to the side plates. A pair of additional crossbars 40, FIGURE 7, also suitably fastened to the side plates 32, 34, carry a horizontal plate 42, FIGURES 6, 7, upon which a drive motor 44 is mounted. The shaft of the motor extends into the box 46 of a reduction gear assembly and the output shaft 48 of the reduction gear carries a cam member 50 and a sprocket member 52 separated by spacer members 54. The cam, sprocket and spacers are bolted together by means of machine screws 56, FIGURES 6 and 7, and the assembly is suitably mounted on a Morse torque limiter 57, Morse Chain Co., item No. 250–1, catalog TL–64, page 4, which in turn is suitably keyed to the shaft 48 of the reduction gear unit. This is a device which will permit slippage of the sprocket 52 with respect to the flanges of the torque limiter 57 if for any reason the machine should become jammed in operation.

Spaced from the motor 44 and forwardly thereof, a rubber covered feed roll 60, FIGURES 6 and 7, is mounted on a shaft 62, the shaft being suitably rotatably supported in end bearings 64 and 66, suitably fixed to the plates 32, 34, respectively. A large opening 68 is provided in the plate 32 to permit insertion or removal of the feed roll 60, and the opening is covered by a plate 70 screwed to the wall 32. The bearing 64 is actually directly carried by the plate 70.

Carried by the feed roll shaft 62 at each end thereof, respectively, is a one way clutch member 72, 74 (Formsprag Overrunning Clutches, Catalog 2106, October 1963, Table I, models FS–05 and FS–04, respectively), which permits rotation of the feed roll in a clockwise direction, FIGURE 6, but prevents its rotation counter-clockwise. A sprocket wheel 76 is secured to the clutch 72 and the clutch is keyed to the shaft 62. A sprocket chain 78 connects the motor sprocket 52 with the feed roll sprocket 76 and drives the feed roll in a clockwise direction only, reverse rotation of the feed roll being stopped by the one way clutches 72, 74. At one outer free end the feed roller shaft 62 carries a hand wheel 75 by means of which an operator may manually rotate the feed roll when threading the web of a roll of stock through the machine.

Figure 23:
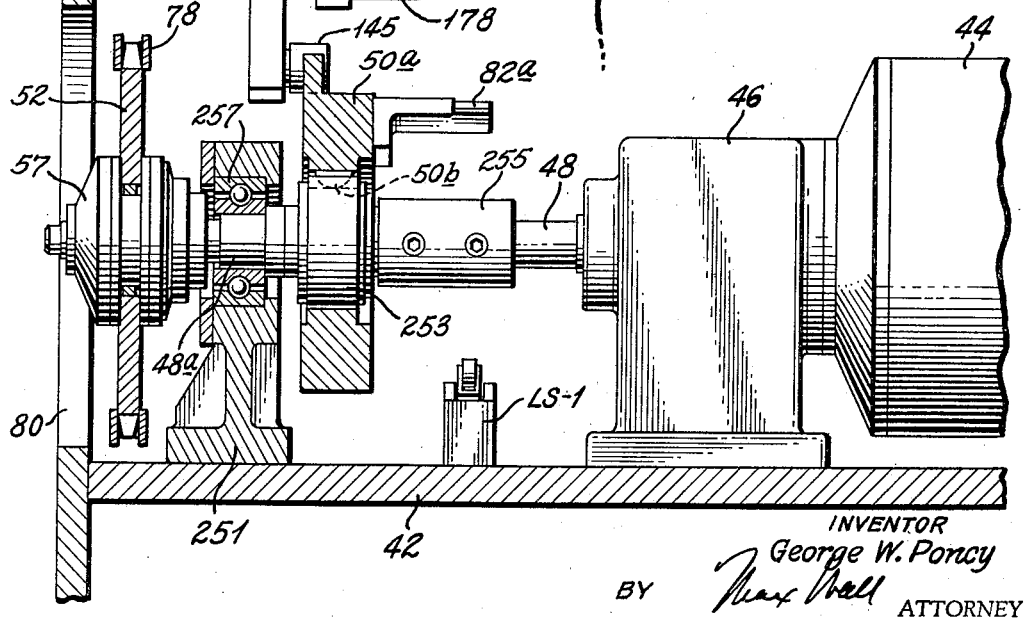
FIGURE 23 is a fragmentary vertical sectional view along line 23—23 of FIGURE 22.
Figure 26:
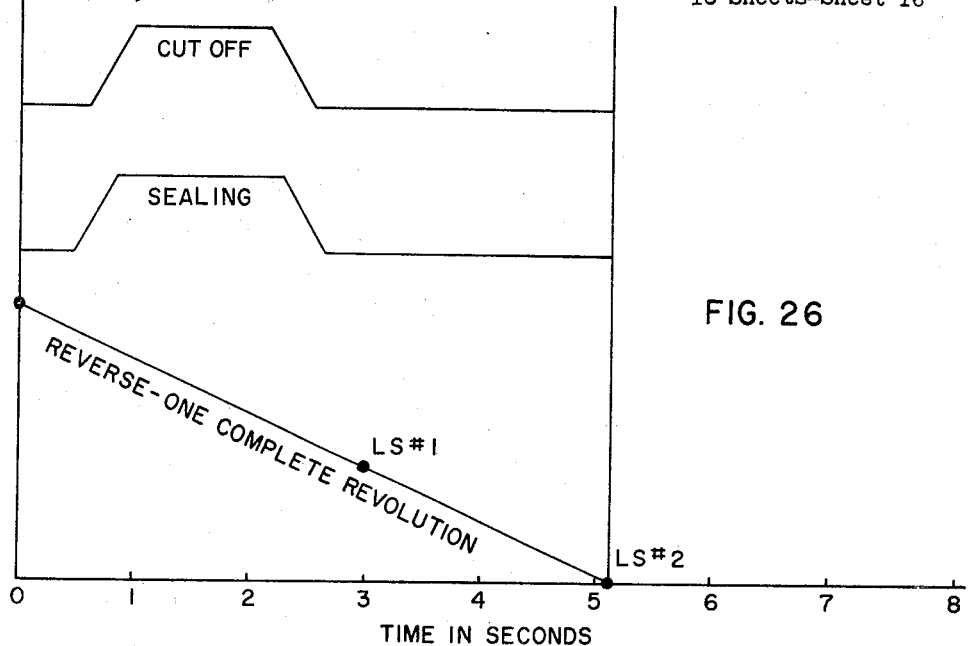
FIGURE 26 is a diagram of the timing cycle for the modification shown in FIGURES 22 and 23.

The side plate 32, FIGURES 7 and 23, also has a large opening 80 adjacent the sprocket-cam assembly, and a switch tripping member 82 is fixed to the sprocket so as to extend through said opening. Around the periphery of said opening and fixed to the plate 32 a plurality of limit switches designated LS–1, LS–2, LS–3, FIGURES 1, 15, are mounted, these being radially adjustable by means of slotted plates 84 and machine screws 86, with respect to the axis of the shaft 48 and the actuating arms of these switches lie in the path of the tripping member 82, to be tripped as said member rotates with the sprocket, for a purpose which will hereinafter be explained.

At the front end of the machine, below the front wall plate 85 there is a large opening 87, FIGURES 5, 6. Above this opening and at each end side thereof a block 90 is secured. An L-shaped bracket 94 is pivotally supported in each block by means of a pivot bolt 96, the bracket being capable of swinging movement towards and away from said opening. The shorter arm 94a, FIGURE 6, of each bracket rotatably supports a pinch roll 98 which extends into the opening and lies in pressure contact with the rubber clad feed roll 60. The brackets 94 are tied together by means of a cross tie-bar 99 which is suitably secured to said brackets. Pressure of the pinch roll against the feed roll is effected by means of a duplicate assembly only one of which is shown, comprising a bolt 100 anchored by means of a screw thread in plate 85 at 100a, a jamming nut 100b locking same in position, the bolt passing through an opening or slot 99a in the tie bar 99. Spring pressure against said tie-bar, brackets and pinch roll is exerted by a compression spring 102 seated on the bolt 100 between washers 104 and 106. It will be obvious that screwing the bolt 100 deeper into the wall plate 85 will increase compression of the spring 102 and ensure tighter engagement of the pinch roll with the feed roll, and that reverse rotation of the bolt 100 will relieve the pressure. Some manipulation of the bolt is originally necessary to determine the exact degree of adjustment required to ensure smooth and uninterrupted feeding of the web stock.

Figure 15:
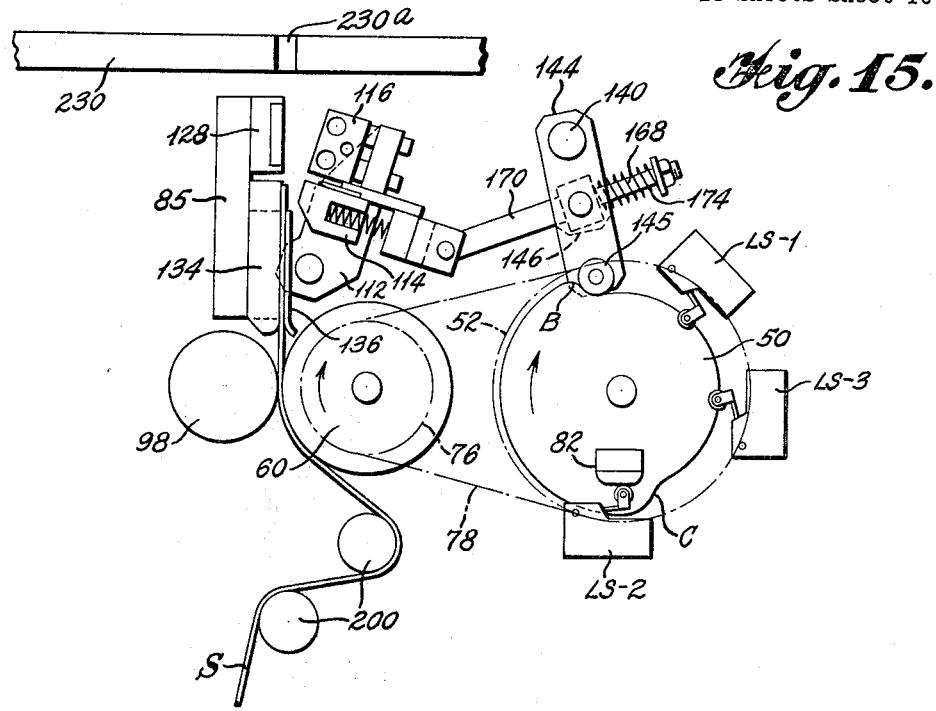

The sealing and cut-off assembly, FIGURES 4, 6, 15, is mounted over the feed roll 60. A rock shaft 110. FIGURES 6, 11, is supported for rotatable movement in the side plates 32, 34. A pair of spaced, upwardly extending lever arms 112 are keyed to the shaft 110, FIGURE 11. A lower clamp jaw 114 is bolted between these arms by means of bolts 115. The rear face 114a of this jaw is drilled at 114b at a number of points to receive a series of springs, the purpose of which will hereinafter appear. A plate 118 is supported between the lever arms 112 above the jaw 114.

A heated sealing jaw 116 is supported on plate 118 above said clamp jaw in spaced relation thereto by means of spacers 118a on the bolts 120, FIGURE 11. The sealing jaw is heated by means of heating elements inserted into the sockets 122 from each end of the jaw, and the temperature is controlled by means of a thermostat inserted into the socket 124, FIGURES 4, 6, 11. The space 126 between the sealing jaw 116 and the clamp jaw is provided to accommodate a cutting-off knife as will be explained. The heat sealing member 116, 132 would have Teflon facing bonded thereto if the bag material used was wholly of plastic material, to ensure release of said sealing members by preventing sticking. Teflon is a trademark identifying a tetrafluorethylene resin. The shaft 110 extends through the wall plate 32, FIGURES 1, 4, 5, and carries a stop lever 111 which is keyed thereto. A tension spring 113 is fastened at one end to the upper part of this stop lever and at its other end to a suitable portion of the plate 32, normally tending to pull the lever to the right, FIGURE 1, an adjustable stop mechanism 117 being provided on the plate 32 to limit movement of said stop lever to the right, FIGURES 1, 4, 5.

The front plate 85, at its upper edge, FIGURE 6, supports a channel-shaped upper backing plate 128, which is bolted to the plate 85 by means of bolts 130. A silicone rubber heating pad 132 is fitted into the channel pocket 128a of the backing plate, the pad lying opposite the face 116a of the sealing jaw and being substantially coextensive therewith.

A lower backing plate 134 is similarly carried by the front plate 85, below and slightly spaced from the upper backing plate 128, The lower plate is supported opposite the clamp jaw 114 and is substantially coextensive therewith. The space between said upper and lower plates is coincident with the space 126 and is intended to receive the knife during the cutting operation when the machine is in motion.

A web stock guide 136, FIGURES 6, 10, in the form of a U-shaped channel member of sheet material, has its flanges 136a bolted at each end to each end, respectively, of the lower backing plate 134, the web 136 of said member being spaced from the back 134a of the backing plate 134 to accommodate and guide the web of stock S as it is fed upwardly through the machine, as will be described.

Further web stock guides are provided above said channel member 136 in the form of end plates 138, FIGURE 10, one of each of which is bolted to the ends of the upper backing plate 128, the plates 138 projecting outwardly of the rear face 128b of the backing plate 128, to guide the edges of stock as it passes through the machine. They also serve to close the ends of the channel pocket 128a. These plates extend downwardly to the upper edge of the flanges of the web stock guide member 136. It will be noted (FIGURE 6) that the web S moves in a straight line through the feed rolls 98, 60, guide member 136, and through the passage between the sealing member 132 and clamping member 116, so that it is fully supported from the point where it is pinched between the feed rolls to its discharge point, thus minimizing the possibility of distorting the web which might cause a jam.

Figure 22:
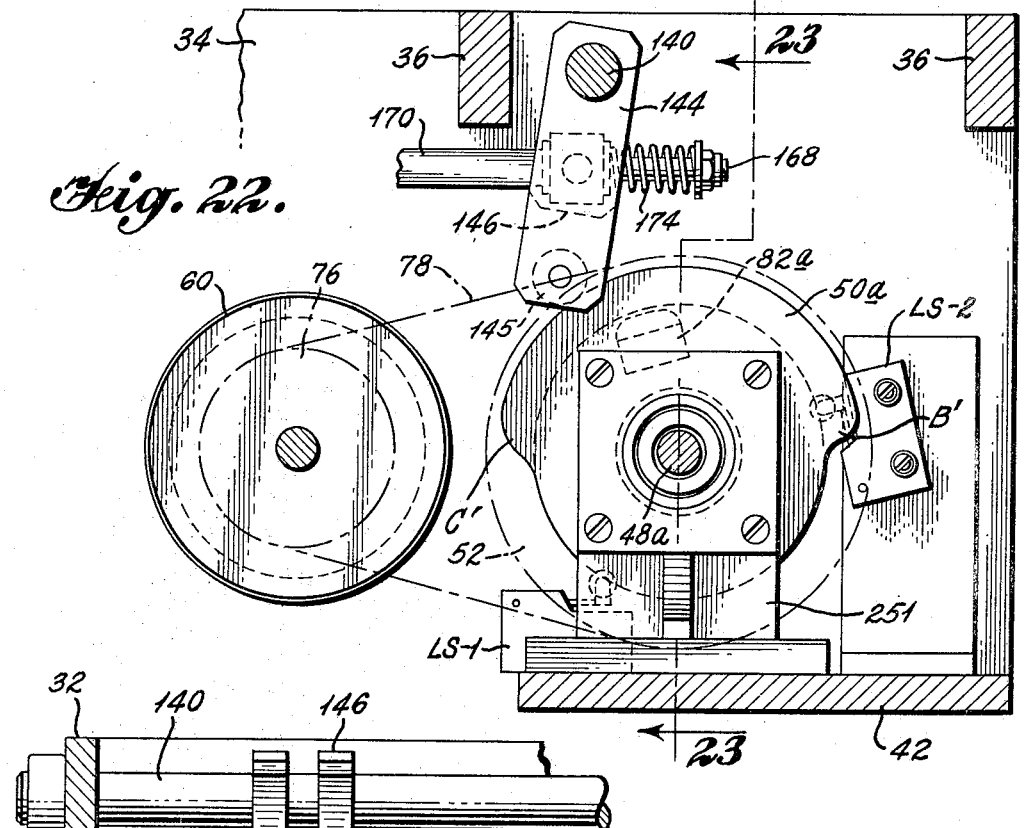
FIGURE 22 is a fragmentary vertical sectional view of a modification of the machine which makes it possible to produce bags of any length desired.

A rock shaft 140, FIGURES 4, 15, 22, is rotatably supported in the wall plates 32, 34 and is secured therein by end collars 142. This shaft is positioned above the motor 44 and slightly to the left of it as shown in FIGURE 6. The shaft carriers three spaced, downwardly extending lever arms 144, 146 and 148, FIGURES 4, 6, 15, each of which is keyed to the shaft so as to rock with it when rotated. The lever arm 144 carries a roller cam follower 145 at its free lower end, and the cam follower engages the cam 50 when the apparatus is in operation.

The lever arms 146 and 148 are shorter than arm 144 and are parts of duplicate assemblies for controlling the action of the heating and clamping jaws, and the cutting-off knife, and therefore only one assembly will be described. A pivot block 152, FIGURES 6 and 9, having a threaded stud 154 with an anti-frictional bearing or bushing 156 seated thereon is carried at the lower end of the lever arm 146, the arm having a bore 158 to accommodate the bushing. The pivot block is secured to the arm by means of a nut and washer, 160, 162, respectively. The pivot block 152 also comprises a boss extending laterally of the stud 154, the boss having a bore of 164 therethrough, extending at a right angle to the major axis of the stud. An anti-friction bushing 166 is seated in said bore. A rod 168, forming part of a linkage member, is slidably received in the bore of said bushing, one end of said rod having a reduced threaded extension 168a extending axially into a threaded socket in rod member 170, which forms the other part of said linkage member. The rod 170 is greater in diameter than the rod 168 and accordingly a stop shoulder 172 is formed where they meet, one end of the bushing 166 being seated against said shoulder. A coil compression spring 174 is seated on the other end of the rod 168 between washers 176 and the assembly is secured in place by a nut 178 which engages the threaded end 168b of the rod. It will be seen that by virtue of this construction and arrangement of parts, the pivot block 152 and bushing 166 are normally urged in the direction of and into engagement with the stop shoulder 172 by the spring 174.

The other end of the link rod 170 is provided with a transverse bore 170a, FIGURE 9. A yoke 180 is connected to the link rod 170 by a bolt 182, FIGURE 9, the yoke 180 being fixed to the pressure bar 184 by means of screws 185 countersunk in the pressure bar from the opposite surface as shown in FIGURE 9. At each end, the pressure bar 184 is provided with holes 184a suitably provided with anti-friction bushings 186. A bolt 188 passes through said bushing and is threaded into a threaded socket 114c in the clamping jaw 114. An elongated knife support plate 190, FIGURES 6 and 12, is secured to the top of pressure bar 184 by a series of screws 192, this plate being rabbeted at its lower leading edge at 190a to accommodate an elongated knife blade 194 seated in said rabbet and suitably fixed to the plate, the blade being coextensive in length with that of the slot 126. The knife plate and blade extend into said slot or space 126 between the upper sealing jaw 116 and the lower clamping jaw 114.

The lower clamping jaw 114, FIGURES 6, 9, 11, as previously described, has sockets 114b in its rear face and coiled compression springs 198 are seated in said sockets, these springs extending outwardly of the rear face of the jaw and bearing against the face 184b, FIGURES 9, 12, of the pressure bar 184, for a purpose which will become apparent as the description proceeds.

Figure 8:
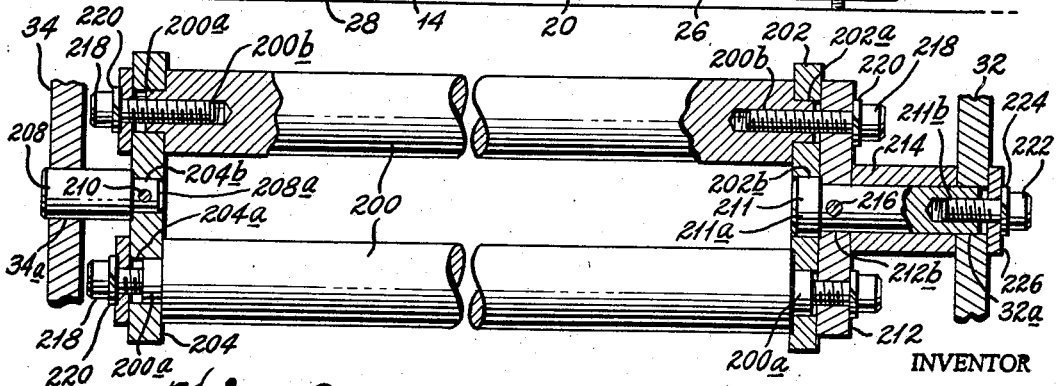
FIGURE 8 is a fragmentary sectional view through the stock tensioning bars and is taken along line 8—8 of FIGURE 6.

Below the feed roll 60, a web tensioning assembly, FIGURES 1, 8, is provided. This mechanism is pivotally mounted in the walls 32, 34, and comprises upper and lower, identical polished round bars 200, each one having a concentric, reduced, stub extension 200a. These bars are supported in spaced relation to one another by means of end plates 202, 204 which have aligned bores 202a, 204a, respectively, to receive the stub extensions. At the left hand end, in FIGURE 8, the end plate 204 is provided with a central bore 204b to receive the reduced stub end 208a of a pivot pin 208.

The pivot pin 208 and plate 204 are fastened together by a dowel pin 210 driven through the plate and stub extension. The pivot pin 208 is seated for rotation in a hole 34a in the wall plate 34. The pivot for the other end of the assembly comprises a headed pin 211, of the head 211a of which is seated in the central bore 202b of the plate 202. Another plate 212 is backed up against the plate 202 and this plate has a bore 212b smaller in diameter than the bore 202b, but concentric therewith, to receive the shank of the pin 211 which passes through a spacer bushing 214, into a hole 32a in the opposite wall plate 32, the end of the shank stopping short of the outside wall of the plate 32. A dowel pin 216 fastens together the plate 212 and the pin 211. The end plates and round bars are held together by means of machine screws 218 which pass through the plates and into tapped holes 200b in the ends of bars 200. Lock washers 220 are provided under the heads of the screws 218 to secure them in position. The right hand pivot pin 211 is drilled and tapped at its end at 211b to receive a machine screw 222, which passes through lock washer 224, bearing washer 226, wall plate 32 and into the tapped hole 211b. It will be obvious from the construcion that tightening the machine screw 222 will lock the web tensioning assembly in any adjusted position of angularity with respect to its axis.

A bag made according to the invention is shown in FIGURES 13 and 14. In these figures, the bag is shown as a laminate of paper 250 plus a coating of a thermoplastic material 252 which may be applied either by roller coating, extrusion, spraying or in the form of a very thin sheet fused thereto. The seal across the bottom of the bag takes effect at 254 in a narrow band. The ends 256 of the bag fold inwardly thereof gusset-fashion when the bag is collapsed, and the sealed portion, exaggerated in length as shown in FIGURE 14, folds under the bag.

The machine operates in the following manner: Assume that a roll of stock has been inserted into the machine and is resting on the cradle formed by the rolls 20, 22, 24, with the web threaded through the tensioning bars, into the guide 136 and upwardly past the clamping jaw 114.

Figure 16:
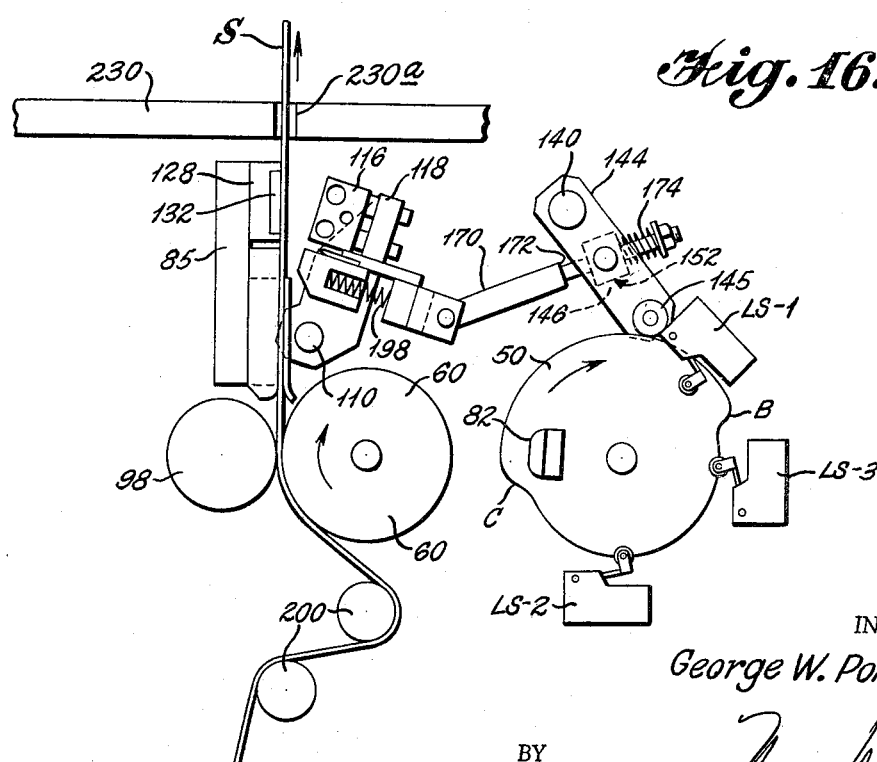
Figure 20:
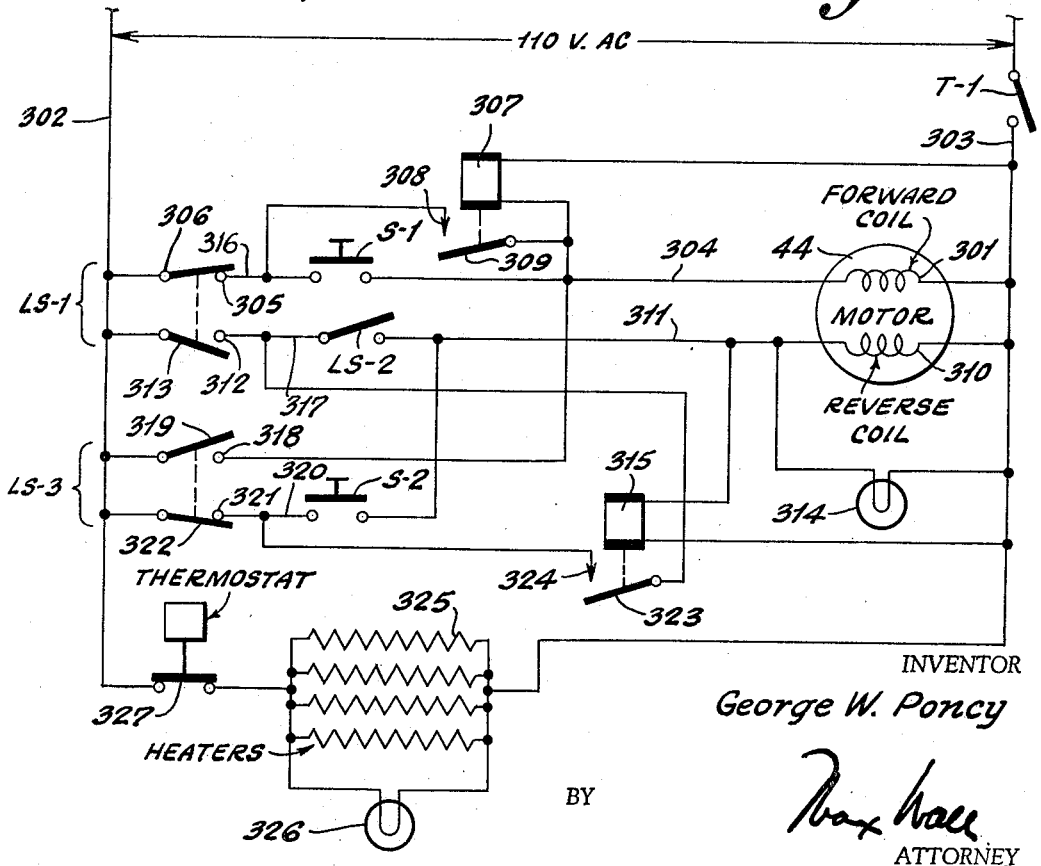
FIGURE 20 is a wiring diagram of the electrical circuit for the machine.

The machine is shown at rest in the diagram of FIGURE 15, with the hump B of the cam 50 about to engage follower 145 on lever arm 144. When the switch T–1, FIGURE 20, is closed, the sealing jaw heaters, thermostat and pilot light are energized. When the heaters have been brought up to proper temperature the pilot light goes out. To obtain a small sized bag, switch S–1 is closed to start motor 44 and the motor rotates in a clockwise direction, driving feeding roll 60 to pass the web stock S through the guide 136 and up between the clamping, cutting and sealing members, the lever arms 112 resting in their open position FIGURE 17. Simultaneously with the feeding of the stock, the hump B of the cam 50 engages the follower 145, pushing lever arm 144, and because they are keyed to the same shaft as lever 144, causing lever arms 146, 148 to move to the right, so that hump B can override the cam follower, with the parts thereupon assuming the position shown in the diagram of FIGURE 16. During this period of operation, feeding of the web stock continues until a bag of the selected length is delivered at the slot 230a of the counter top 230. This action continues until the cam reaches the position shown in the diagram of FIGURE 17.

As shown in FIGURE 17, the cam 50 has rotated through an arc to bring the hump C thereof to a position where the lever arms 146 and 148 can return, under pressure of spring 174, to the starting position, thereby also returning the lever 144, as shown in FIGURE 15. At the same time, the tripping lever 82 engages the actuating arm of limit switch LS–1, causing a reversal of direction counterclockwise of rotation of the motor. Reverse rotation of the motor interrupts rotation of the feed roll, due to the one way clutches 72, 74. A proper length of web stock has now been fed above the counter top to form a bag of the desired length or height, and it now becomes necessary to seal off the bottom of the web stock to form the bag, and to cut it off below the seal.

This is accomplished since rotation of the motor has been reversed, by movement of the cam 50 in a counterclockwise direction, FIGURE 18, the hump C thereof engaging the follower 145 to swing lever arm 144 and lever arms 146 and 148, FIGURE 4, about their pivot 140, causing a straightening of the toggle joint between the link 170, FIGURE 18, and the clevis 180, thereby swinging lever arms 112 about their pivot 110 against the tension of spring 113, FIGURE 1, bringing clamping jaw 114 and heat sealing jaw 116, under the urging of the springs 198, into contact with the web stock against the backing members, heating same to soften the plastic material in the web stock to bring it up to fusing temperature, the pressure of the contacting parts causing a transverse seal to be formed along that portion of the stock being held below the counter. The parts are now in the position shown in FIGURE 18, with the knife 194 still retracted in the slot of the movable pressure member.

Figure 19:
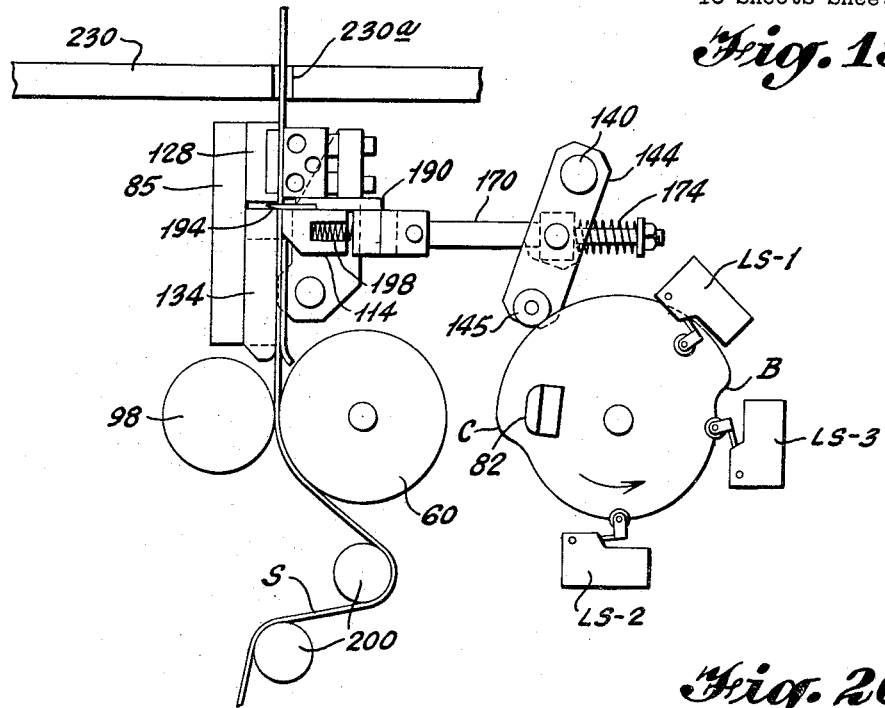

Continued counterclockwise rotation of the cam 50 forces lever arm 144, FIGURE 19, and lever arms 146 and 148, FIGURE 4, further to the left, pushing the link 170, FIGURE 19, clevis 180, plate 190 and knife 194 to the left against the force of springs 198, compressing them, the knife sliding into and cutting the web stock downstream of or below the seal. When the follower 145 rides over the hump of the cam the parts again assume the position shown in the diagram of FIGURE 15, wherein the lever arms 146 and 148 have moved in a portion of their arc to the right, carrying with them the clamping and sealing jaws 114, 116, respectively, under the pull of the spring 113, FIGURE 1.

As the cam rotated to bring follower 145 to the low position beside hump B, the tripping lever 82 simultaneously actuated the lever arm of the limit switch LS–2 to open this normally closed switch, thereby interrupting the motor circuit and stopping the machine. It is now ready to begin a new cycle of operation based on selection of either S–1 or S–2, according to whether a short or long bag is desired.

The foregoing describes the operation to produce a short bag. If a longer bag is desired, the switch S–2 is closed. This will cause the motor 44 and cam 50 to run in a counterclockwise direction from limit switches LS–2 to LS–3, during which no feeding takes place, whereupon the motor will be reversed and then move in a clockwise direction as described above to feed for a longer period (distance from LS–3 to LS–1) to produce a longer bag, the added length being the distance from LS–2 to LS–3.

As heretofore disclosed, a bag of predetermined length could be made. The invention also contemplates that the operator of the machine, at will, shall be able to make a bag of any desired length. A modification according to this form of the invention is shown in FIGURES 22 and 23, the wireing diagrams therefor being shown in FIGURES 24 and 25.

As shown in FIGURES 22 and 23, in the modified construction, the output shaft 48 is connected by a sleeve coupling member 255 to an extension jackshaft 48a, the extension being supported by a jackshaft bearing bracket 251 having a bearing 257. The driving cam 50a, on one side of the jackshaft bearing, is keyed at 50b to a one-way clutch assembly 253 which in turn is keyed to the jackshaft 48a, the jackshaft running free in the clutch when the motor is driving forward or in the feeding direction, so that the cam is stationary, the clutch locking the cam to the shaft only when the motor is reversed (running counterclockwise). On the other side of the jackshaft, the shaft extension 48a carries the torque limiter 57 on which the sprocket 52 is seated, carrying the drive chain 78 which connects said sprocket with the sprocket 76 of the feed roll.

During the feeding cycle, the cam follower 145, FIGURES 22 and 23, remains on the lower level of the stationary cam 50a, with actuator 82a depressing the contact lever of the normally closed limit switch LS–2. The feeding cycle continues as long as the push button switch 336, FIGURE 25, is depressed or until the timers 370 or 378 (Ti–1, Ti–2) have completed the pre-set cycles activated by their respective pushbuttons 375 and 374.

At the end of the feeding cycle, the motor 44 reverses (counterclockwise) causing the cam 50a, which is keyed to the jackshaft extension 48a, FIGURES 22 and 23, through a one-way clutch assembly 50b, to rotate in a counterclockwise direction.

The cam follower 145 thus begins to rise on the hump C of the cam and initiates the identical sequence in clamping, sealing, and cutoff action heretofore described.

At the completion of a cycle of rotation, the cam returns to its original position with the cam follower on the lower level of the cam and the actuator depressing the contact lever of the normally closed limit switch LS–2, shutting off the motor.

During the rotating cycle (clamping, sealing and cutoff action) the actuator 82a on the cam momentarily depresses the contact lever of the normally closed limit switch LS–1, FIGURE 23, for purposes fully described in connection with the wiring diagram.

In the embodiment of the machine operating as illustrated in FIGURE 20, the "forward" motor winding 301 is connected between the supply wires 302 and 303 through a wire 304, the "Short Bag" push button switch S-1 and the normally closed contacts 305-306 of limit switch LS-1. The winding of a holding relay 307 is connected in parallel with the "forward" motor winding 301. The contacts 308-309 of this relay are connected across switch S-1.

The motor "reverse" winding 310 is connected between the supply wires 302, 303 through a wire 311, to the normally open contacts of limit switch LS-2 (engaged by the tripping member 82 in the "rest" position of FIGURE 15), and the normally open contacts 312-313 of limit switch LS-1.

A pilot lamp 314 and the winding of a holding relay 315 are respectively connected in parallel with the motor "reverse" winding 310.

Switch S-1 is connected in series with contacts 305-306 by a wire 316; limit switch LS-2 is connected in series with contacts 312-313 by a wire 317; wire 304 is connected to line wire 302 through the normally open contacts 318-319 of limit switch LS-3; wire 311 is connected to line wire 302 through the "Long Bag" push button switch S-2, a wire 320, and the normally closed contacts 321-322 of limit switch LS-3. Wire 317 is connected to wire 320 through the contacts 323-324 of relay 315.

The main control switch T-1 is connected in the supply line wire 303. The parallel-connected heater windings 325 and pilot lamp 326 are connected between line wires 302 and 303 through the thermostat switch 327. The heater circuit is therefore energized by the closure of switch T-1.

When switch S-1 is closed, to provide a short bag, the motor "forward" winding 301 and holding relay 307 become energized through the contacts 305-306 of limit switch LS-1, and the relay contacts 308-309 maintain winding 301 energized after switch S-1 is released, causing clockwise movement of cam 50 and feeding action of the bag stock, which continues until tripping member 82 engages limit switch LS-1; meanwhile limit switch LS-2 closes since it is no longer engaged by member 82.

The engagement of member 82 with limit switch LS-1 opens contacts 305-306, deenergizing motor winding 301 and relay 307, and closes contacts 312-313, whereby "reverse" winding 310 become energized through a circuit comprising line wire 303, "reverse" winding 310, wire 311, limit switch LS-2 (closed), wire 317, contacts 312-313 (closed) and line wire 302. This takes place when cam 50 is in the position of FIGURE 17.

As above explained, reverse rotation (counterclockwise from the position of FIGURE 17) is accomplished by sealing and cutting action. When cam 50 rotates counterclockwise to bring tripping member 82 into engagement with limit switch LS-2, the "reverse" winding 310 becomes deenergized, leaving the parts in the positions of FIGURE 15, ready for a new cycle.

When switch S-2 is closed to provide a long bag, "reverse" winding 310 first becomes energized through a circuit comprising line wire 303, "reverse" winding 310, wire 311, switch S-2, wire 320, normally closed contacts 321-322 of limit switch LS-3, and line wire 302. Pilot lamp 314 and relay 315 simultaneously become energized. The closure of limit switch LS-2 established a holding circuit across switch S-2 comprising relay contacts 323-324 and limit switch LS-2 which maintain relay 315 and "reverse" winding 310 energized when switch S-2 is released. Reverse movement (counterclockwise) of cam 50 from the position of FIGURE 15 continues until tripping member 82 engages limit switch LS-3, causing contacts 321-322 to open and 318-319 to close. The opening of contacts 321-322 causes "reverse" winding 310 to become deenergized and also causes relay 315 to drop out.

The closing of contacts 318-319 energizes "forward" winding 301 and relay 307, initiating the feeding action as above described. Thus "forward" winding 301 becomes energized through a circuit comprising line wire 303, winding 301, wire 304, relay contacts 308-309, wire 316, contacts 305-306 of limit switch LS-1 and line wire 302.

The feeding action continues (cam 50 rotates clockwise) until tripping member 82 engages limit switch LS-1. This deenergizes "forward" winding 301 and reenergizes "reverse" winding 310 in the manner above described for providing a short bag, by the closure of contacts 312-313 of limit switch LS-1. As above described, sealing and cutting action now takes place, and finally tripping member 82 engages limit switch LS-2 to stop the parts in the positions of FIGURE 15, ready for a new cycle.

Figure 21:
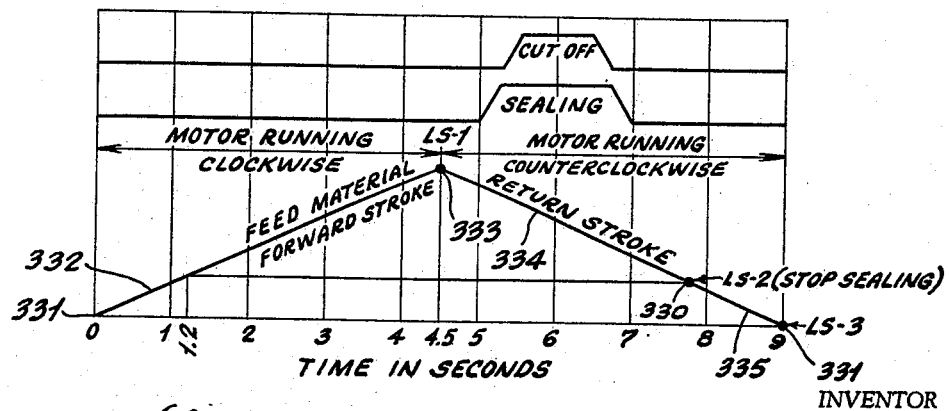
FIGURE 21 is a diagram of the timing cycle for the machine.

FIGURE 21 graphically illustrates the time relationships in a typical bag-forming cycle. Thus, assuming that a long bag is to be formed, the cycle begins at the point 330 in FIGURE 21, with the initial actuation of switch S-2 and the reverse movement of cam 50 until tripping member 82 engages limit switch LS-3 at 331. Forward energization of motor 44 then occurs, causing feeding action of the bag stock, as indicated by the line 332 in FIGURE 21, until limit switch LS-1 is engaged by tripping member 82 at point 333. Reverse energization of motor 44 then occurs, as indicated by the line 334, causing sealing and cutoff action, until limit switch LS-2 is engaged by tripping member 82 at point 333. Reverse energization of motor 44 then occurs, as indicated by the line 334, causing sealing and cutoff action, until limit switch LS-2 is engaged by tripping member 82, returning the parts to their starting positions at the point 330.

The cycle for forming a short bag is similar except that the reverse energization portion of the above described cycle, indicated at 335 in FIGURE 21, is omitted and the point 331 coincides with the point 330.

Figure 24:
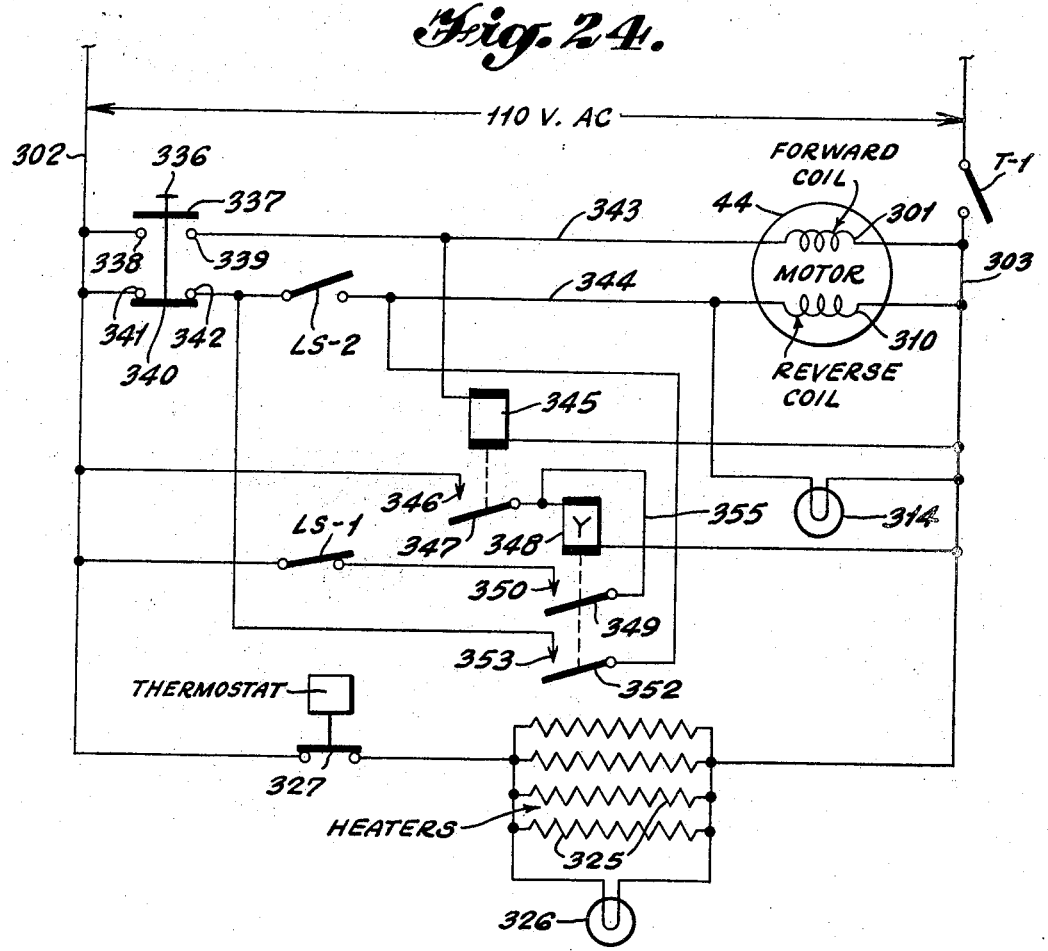
FIGURE 24 is a basic wiring diagram of the electrical circuit of the machine shown in FIGURES 22 and 23.

In the embodiment of the machine according to the modification as shown in FIGURES 22 and 23, FIGURE 24 illustrates a circuit which may be employed to form a bag of any desired length from bag to bag, determined by the length of time that a push-button control switch 336 is held depressed. Said push-button switch has an upper pole 337 engageable with a pair of contacts 338, 339 when the switch is actuated, and a lower pole 340 normally engaging a pair of contacts 341, 32. "Forward" motor winding 301 is connected to line wires 302 and 303 through a wire 343 and the contacts 339, 338 as shown. "Reverse" motor winding 310 is connected to line wires 302 and 303 through a wire 344, limit switch LS-2, and the switch contacts 342, 341. A holding relay 345 has its winding connected in parallel with winding 301 and has normally open contacts 346, 346. Another relay 348 has its winding connected to line wires 303 and 302 through contacts 346-347, and has a holding circuit comprising a wire 355, connected to contact 347, and connected through one set of its own contacts 349-350 and limit switch LS-1 to line wire 302. Wire 344 is connected by a wire 351 through another set of relay contacts 352-353 to switch contact 342.

When switch 336 is actuated, pole 337 bridges contacts 338-339, causing "forward" winding 301 and relay 345 to become energized, and initiates bag stock feeding action, which continues as long as the switch button is held depressed. Contacts 341, 342 are opened, but relay 348 becomes energized by the closure of relay contacts 346, 347. The holding circuit for relay 348 closes at contacts 349-350 and remains closed, maintaining relay 348 energized as long as limit switch LS-1 stays closed. Thus, when switch 336 is released, "reverse" winding 310 becomes energized through a circuit comprising line wire 303, winding 310, wire 344, limit switch LS-2, contact 342, pole 340, contact 341 and line wire 302.

Energization of "reverse" winding 310 causes the sealing and cut-off action, as above described, and the return of cam 50a to its starting position, wherein limit switch LS-2 is opened, after limit switch LS-1 is temporarily opened to cause relay 348 to drop out.

As previously mentioned, the circuit of FIGURE 25 may be employed with the modification of FIGURES 22 and 23. This circuit makes it possible to produce bags of two different predetermined lengths as well as bags of any desired length, at the will of the operator. This is accomplished by setting a timer for any desired length of feed. Thus, FIGURE 25 includes substantially the same circuit as FIGURE 24, except that contact 341 is connected by a wire 356 to a pole 357 of a normally deenergized relay 358, said pole 357 normally engaging a stationary contact 359. Contact 359 is connected by a wire 360 to a pole 361 of another normally denergized relay 362, said pole 361, normally engaging a stationary contact 362a, which is connected by a wire 363 to a line wire 302. Therefore, with relays 362 and 358 deenergized, contact 341 is connected to line wire 302 as in FIGURE 24 and the same type of operation may be obtained by actuating the push-button switch 336.

Relay 358 has a set of contacts 364–365 connected between line wire 302 and wire 343 by respective wires 366 and 367, thereby being in parallel with the upper contacts 338–339 of switch 336, and thereby energizing the "forward" motor winding 301 when closed, namely, when relay 358 is energized. One terminal of the winding of relay 358 is connected by a wire 368 to line wire 303. The other terminal of said winding is connected through a wire 369, the normally closed timer contacts 371–372 opened by the timing motor 370 after a define predetermined time of operation of said motor 370, a wire 373 and a push button switch 374 to line wire 302. Relay 358 has a holding circuit comprising a pair of contacts 375–376 thereof connected across switch 374, namely, connected respectively to wires 373 and 366, to maintain relay 358 energized during operation of timing motor 370 and after switch 374 is released. The winding of timing motor 370 is connected in parallel with relay 358.

When switch 374 is closed, even momentarily, relay 358 and timer motor 370 or timer Ti–2 become energized in parallel by a circuit comprising line wire 302, switch 374, wire 373, timer contacts 371–372, timer 370 and relay 358 in parallel, and line wire 303. The closure of relay contacts 375–376 maintains the above circuit energized after switch 374 is released. The closure of relay contacts 364–365 energizes the "forward" winding 301 of motor 44, and this winding remains energized, providing the bag stock feeding action until timer contacts 371–372 open. This deenergizes relay 358, opening the "forward" motor winding circuit at contacts 364–365 and allowing pole 357 to drop into engagement with contact 359.

When contacts 357–359 close, contact 341 becomes connected to line wire 302 through wire 365, contacts 357–359, wire 360, contacts 361–362a and wire 363. Since limit switch LS–2 is closed, the "reverse" motor winding 310 becomes energized as in FIGURE 24, causing sealing and cut-off action and returning the parts to their starting positions with limit switch LS–2 opened, after limit switch LS–1 is temporarily opened to cause relay 348 to drop out.

A second push-button switch 375 is connected through the contacts 376–377, and the motor 378 of a second timer and the winding of relay 362, in parallel, between the line wires 302 and 303, in the same manner as the circuit associated with switch 374, to provide a different feeding time, and hence a different bag length.

The timers 370 and 378 are of conventional construction and are of a type whose contacts close immediately responsive to deenergization of the associated timer motors.

Obviously, each timer may be set for any desired period of time within its range, and additional timing circuits may be added, so that more than two different bag lengths may be obtained, if so desired. Each additional timing circuit will include a relay like relays 358 and 363, having a set of normally closed contacts connected in the series circuit including the contacts 361–362a and 357–359.

I claim:

1. A machine for making bags from heat sealable tubular stock comprising means for clamping and sealing said stock, means for cutting off a sealed portion of said stock, means for feeding said stock past said clamping, sealing and cutoff means, means for driving said feeding means, means for interrupting said feeding means and for reversing said driving means, and means including said interrupting means actuated on reversal of and including said driving means for operating said clamping, sealing and cutoff means.

2. A machine according to claim 1 in which said drive means comprises a drive shaft, a first rotary member on said shaft connected to said feeding means, and a second rotary member connected to said first rotary member, said second rotary member comprising one of said interrupting means, and clutch means coupling said first rotary member with said feeding means.

3. A machine according to claim 1, in which said drive means comprises a drive shaft, a first rotary member on said shaft connected to said feeding means, a second rotary member on said shaft, clutch means coupling said second rotary member to said shaft, said second rotary member comprising one of said interrupting means.

4. A machine according to claim 1, in which said interrupting means comprises a cam on said driving means and switch means for controlling said driving means operable by said cam; and in which said actuating means comprises a lever operable by said cam, said lever being connected to said clamping, sealing and cutoff means.

5. A machine for making bags from heat sealable tubular stock comprising means for clamping and sealing said stock, means for cutting off a sealed portion of said stock, means for feeding said stock past said clamping, sealing and cutoff means, means for driving said feeding means, a cam driven by said driving means, a first switch means disposed in the path of said cam and actuated thereby upon rotation of said cam in one direction to interrupt said driving and feeding means, and to reverse the direction of rotation of said cam, thereby actuating said clamping, sealing and cutoff means to clamp, seal and cutoff a bag during said reverse movement a second switch means in the path of said cam, and means to terminate said reverse rotation responsive to actuation of said second switch means.

6. A machine for making bags from heat sealable tubular stock comprising means for supporting a supply of said stock in continuous form, means for clamping and sealing the web of said stock to form a transverse seal thereon at spaced intervals, means for cutting off the sealed portion of said stock, means for feeding said stock past said clamping, sealing and cutoff means, means positioned between said supporting means and said feeding means for tensioning said web, means for interrupting said feeding means and for reversing said driving means, and means including said interrupting means actuated on reversal of and including said driving means, for operating said clamping, sealing and cutoff means.

7. A machine for making bags from heat sealable tubular stock comprising pairs of opposed clamping and heat sealing members, one of said pairs being movable in an opening and closing direction with respect to the other, bag cutoff means mounted on the said movable pair and having means for urging said movable pair in the closing direction, stock feeding means positioned adjacent said members for feeding stock between them, means for driving said feeding means, means for interrupting said feeding means and for reversing said driving means, means connected to said cutoff means actuated by said interrupting means for operating said movable means to close against the other pair upon interruption of said feeding means and reversal of said driving means, to clamp said stock, make a seal and cutoff a bag.

8. A machine according to claim 7, in which the movable pair comprises an upper and lower sealing jaw and clamping jaw, respectively, having a space between them and a cutoff knife slidably disposed in said space, said cutoff knife being linked to said means actuated by said interrupting means.

9. A machine for making bags from heat sealable tubular stock comprising pairs of opposed clamping and heat sealing members, one of said pairs being fixedly mounted and the other being mounted for pivotal movement with respect to the fixed pair, cutoff means mounted on the pivoted member, stock feeding means positioned adjacent said members for feeding stock between them, means for driving said feeding means and for reversing said driving means, means in the path of said interrupting means and connected to said pivoted member for actuating said member and said cutoff means upon the interruption of said feeding means and the reversal of said driving means.

10. A machine according to claim 9, in which said pair mounted for pivotal movement comprise spaced lever arms mounted on a rock shaft, a clamping member secured between said arms and positioned opposite the fixed clamping member pair, a heat sealing member secured between said arms and positioned opposite the fixed sealing member, said heat sealing members being spaced from the said clamping members, a cutoff knife slidably positioned in said space on said pivoted member, said cutoff knife being connected to said means in the path of said interrupting means.

11. In a machine for making bags from heat sealable tubular stock, a rotary member having a rest position, a first limit switch, a tripping element on said rotary member engaging said first limit switch in said rest positon, a second lmit switch engageable by said tripping element in a second position of said rotary member, means for feeding said tubular stock, common drive means connected to said rotary member and said stock feeding means, means to energize said drive means in a first direction to move said rotary member from a starting position toward said second position and simultaneously actuate said feeding means, means for clamping and sealing said stock, means to terminate movement of said drive means in said first direction responsive to engagement of said tripping element with said second limit switch, means to energize said drive means in a reverse direction responsive to the engagement of said tripping element with said second limit switch, means actuating said clamping and sealing means responsive to the reverse movement of said rotary member, means for cutting off a sealed portion of said stock during said reverse movement, and means for deenergizing said drive means responsive to the engagement of said tripping element with said first limit switch when the rotary member returns to said rest position.

12. In a machine for making bags from heat sealable tubular stock, a rotary member having a rest position, a first limit switch, a tripping element on said rotary member engaging said first limit switch in said rest element on said rotary member engaging said first limit switch in said rest position, a second limit switch engageable by said tripping element in a second position of said rotary member, means for feedng said tubular stock, common drive means connected to said rotary member and said stock feeding means and having a forward coil and a reverse coil for respectively actuating said drive means forwardly and reversely, means to energize said forward coil to move said rotary member from a starting position forwardly toward said second position and simultaneously actuate said feeding means, means for clamping and sealing said stock, means to deenergize said forward coil responsive to engagement of said tripping element with said second limit switch, means to energize said reverse coil responsive to said last named engagement to reverse said drive means, means actuating said clamping and sealing means responsive the reverse movement of said rotary member, means for cutting off a sealed portion of said stock during said reverse movement, and means deenergizing said reverse coil responsive to the engagement of said tripping element with the first limit switch when the rotary member returns to said rest position.

13. In a machine for making bags from heat sealable tubular stock, a rotary member having a rest position, a first limit switch, a tripping element on said rotary member engaging said first limit switch in said rest position, a second limit switch engageable by said tripping element in a second position of said rotary member, means for feeding said tubular stock, drive means connected to said rotary member, coupling means including a one-way clutch connecting said drive means to said stock feeding means, said drive means having a forward coil for actuating said drive means in a forward direction wherein said feed means is driven by said one-way clutch, said drive means having a reverse coil for actuating said drive means in a reverse direction, means to energize said forward coil to move said rotary member from a starting position forwardly toward said second position and to simultaneously actuate said feeding means, means for clamping and sealing said stock, means to deenergize said forward coil responsive to engagement of said tripping element with said second limit switch, means to energize said reverse coil responsive to said last-named engagement, whereby to reverse said drive means, means actuating said clamping and sealing means responsive to the reverse movement of said rotary member, means for cutting off a sealed portion of said stock during said reverse movement, and means deenergizing said reverse coil responsive to the engagement of said tripping element with the first limit switch when the rotary member returns to said rest position.

14. The structure of claim 13, and means to at times energize said reverse coil for a predetermined period of time prior to energizing said forward coil, whereby to move said rotary member in a reverse direction before commencing feeding action for obtaining a relatively long feed of tubular stock before the initiation of clamping, sealing and cutting action.

15. The structure of claim 13, and a third limit switch engageable by said tripping element, said third limit switch being spaced in a reverse direction from said first limit switch, means to energize said reverse coil to move said rotary member in a reverse direction from said rest position until said tripping element engages said third limit switch, and means to energize said forward coil responsive to the last-named engagement of the tripping element with said third limit switch, whereby to obtain a relatively long feed of tubular stock before the initiation of clamping, sealing and cutting action.

16. In a machine for making bags from heat sealable tubular stock, a rotary member having a rest position, a limit switch, a tripping element on said rotary member engaging said limit switch in said rest poston, means for feeding said tubular stock, drive means connected to said rotary member, coupling means including a one-way clutch connecting said drive means to said stock feeding means, said drive means having a forward coil for actuating said drive means in a forward direction wherein said feed means is driven by said one-way clutch, said drive means having a reverse coil for actuating said drive means in a reverse direction, means to energize said forward coil to move said rotary member from a starting position forward and to actuate said feed means, means for clamping and sealing said stock, means to deenergize said forward coil and energize said reverse coil after a desired length of stock has been fed, whereby to reverse said drive means, means actuating said clamping and sealing means responsive to the reverse movement of said rotary member, means for cutting off a sealed portion of said stock during said reverse movement, and means deenergizing said reverse coil responsive to the engagement of said tripping element with said limit switch when the rotary member returns to said rest position.

17. The structure of claim 16, and wherein the means to energize the forward coil comprises a source of current, timed switch means, and circuit means connecting said forward coil to said source through said timed switch means, whereby to maintain said forward coil energized for a predetermined period of time.

18. The structure of claim 17, and wherein said timed switch means includes a relay having a first pair of contacts, included in said circuit means, and means to energize said relay and hold said contacts closed during said predetermined time period, said relay having a second pair of contacts closing when the relay is deenergized, and wherein the means to energize the reverse coil includes further circuit means connecting said reverse coil to said source of current through said second pair of contacts.

19. The structure of claim 18, and wherein said limit switch is included in said further circuit means.

References Cited

UNITED STATES PATENTS

| | | | |
|---|---|---|---|
| 2,679,280 | 5/1964 | Marsh | 156—515 |
| 3,185,609 | 5/1965 | Merithew et al. | 156—530 |
| 3,196,067 | 7/1965 | Techtmann | 156—530 |
| 3,354,018 | 11/1967 | Lazear et al. | 156—515 X |
| 2,707,985 | 5/1955 | Binnall | 156—515 |
| 3,234,072 | 2/1966 | Dreeben | 156—583 X |
| 3,283,671 | 11/1966 | Campbell | 156—510 X |
| 3,321,354 | 5/1967 | Sloan et al. | 156—510 |

HAROLD ANSHER, Primary Examiner

T. R. SAVOIE, Assistant Examiner

U.S. Cl. X.R.

156—583